United States Patent Office 3,280,157
Patented Oct. 18, 1966

3,280,157
PEROXY STEROIDS AND METHODS FOR
THEIR MANUFACTURE
Theodore Legatt, Bloomfield, and Elliot L. Shapiro,
Cedar Grove, N.J., assignors to Schering Corporation,
Bloomfield, N.J., a corporation of New Jersey
No Drawing. Filed Oct. 22, 1965, Ser. No. 502,298
26 Claims. (Cl. 260—397.4)

This application is a continuation-in-part of copending applications Serial Nos. 322,021 and 342,280, both now abandoned of Theodore Legatt and Elliot Shapiro filed November 7, 1963 and February 3, 1964, respectively, each of which, in turn, is a continuation-in-part of application Serial No. 252,068, now abandoned, filed January 17, 1963.

This invention relates to compositions of matter identified as 10-hydroperoxy-13-alkyl-gonanes and to intermediates and processes for making such compositions.

The invention sought to the patented in its composition aspect is described as residing in the concept of a chemical compound having a molecular structure in which there is attached to a 13-alkyl gonane nucleus an oxygen function at C–3 of the group consisting of a keto group having an A-ring unsaturation α(β) thereto (i.e. a Δ$^1$- and/or Δ$^4$-unsaturation) and a hydroxy group with a Δ$^4$-unsaturation α(β) thereto; a hydroperoxy group at C–10 and a configuration about C–17 of the group consisting of:

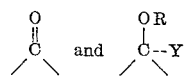

wherein R represents H and hydrocarbon carbonyl having up to 8 carbon atoms, and Y is a member of the group consisting of hydrogen, lower alkyl, lower alkenyl, lower alkynyl, and halogeno-lower alkynyl. The 13-alkyl groups in the gonane nucleus are preferably lower alkyl groups.

The invention sought to be patented in one of its process aspects is described as residing in the concept of reacting a 3-keto-13-alkyl-1(10)-gonene, or a 3-keto-13-alkyl-5(10)-gonene, or a 3-hydroxy (α and β)-13-alkyl-5(10)-gonene, with a source of oxygen, such as air, oxygen, peroxides, and the like; with or without promotors, whereby there is produced respectively, a 3-keto-10-hydroperoxy-13-alkyl-1-gonene, a 3-keto-10-hydroperoxy-13-alkyl-4-gonene, and a 3-hydroxy (α and β)-10-hydroperoxy-13-alkyl-4-gonene.

The invention sought to be patented in another of its process aspects is described as residing in the concept of reacting a 3-keto-10-hydroperoxy-13-alkyl-4-gonene (produced by the above described oxidation process aspect of this invention), or a 10-alkanoate ester thereof with an alkali metal borohydride (preferably sodium borohydride) in an alcohol (preferably a lower alkanol such as methanol), whereby the 3-keto group is reduced to a hydroxy function and there is produced a 3-hydroxy (α and β)-10-hydroperoxy-13-alkyl-4-gonene or a 10-alkanoate ester thereof.

In a pictorial sense, the novel, compounds of our invention may be described as having minimally the following formula:

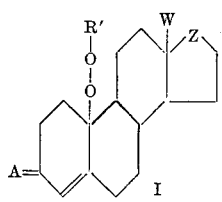

wherein A is a member selected from the group consisting of oxygen (H,βOR″), and (H,αOR″); and R′ and R″ are members selected from the group consisting of hydrogen and hydrocarbon carbonyl having up to eight carbon atoms; W is lower alkyl; and Z is a member of the group consisting of

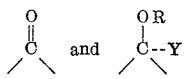

R being a member selected from the group consisting of hydrogen and hydrocarbon carbonyl having up to eight carbon atoms; and Y being a member selected from the group consisting of hydrogen, lower alkyl, lower alkenyl, lower alkynyl, halogenoethinyl, and trifluoromethylethinyl; and, when A is oxygen, the 1-dehydro- and the 1-dehydro-4,5-dihydro analogs of the foregoing.

In the specification and claims of this application, when a compound name does not specify the configuration at C–3, e.g. 10-hydroperoxy-17α-ethinyl-4-estrene-3,17β-diol 17-acetate, there is implicitly included therein both the 3β-hydroxy compound and the 3α-epimer thereof, e.g. 10-hydroperoxy-17α-ethinyl-4-estrene-3β,17β-diol 17-acetate and 10-hydroperoxy-17α-ethinyl-4-estrene-3α,17β-diol 17-acetate, respectively.

Representative of the hydrocarbon carbonyl ester groups contemplated at C–17, 10, and 3 as depicted by R, R′, and R″, are lower alkanoyl such as acetyl, propionyl, caproyl, capryloyl, propargoyl, acryloyl, cyclopentylacetyl, and the like, as well as aromatic carbonyl groups such as benzoyl, and methyl homologs thereof, e.g. o, m, and p-toluyl.

By lower alkyl, as representative of W and Y, are contemplated hydrocarbon radicals having up to 4 carbon atoms such as methyl, ethyl, n- and iso-propyl, n-, iso- and tert.-butyl, and the like, of which methyl and ethyl are preferred.

Representative of Y as lower alkenyl are such as vinyl and allyl; as lower alkynyl are such as ethinyl and propargyl; and as halogenoethinyl are such as chloroethinyl and bromoethinyl.

The foregoing formula delineations are requisite in order for the composition of matter to fall within the scope of our concept. Other substituents may be present. For example, a methyl group may be present at the 6- and/or the 16-position, an oxygen function such as keto or hydroxy may be present at the 11-position and halogen may be present at one or more of the 6, 9, and 11-positions. The only limiting features of our concept insofar as it pertains to compositions of matter are those set forth above. In other words, our novel compounds are 10-hydroperoxy (or alkanoyloxy)-13-alkyl-gonanes having C-17 substituents are described above and a 3-oxygenated-α,β-unsaturated system, i.e. a 3-keto-4-dehydro-a 3-keto-1-dehydro-, a 3-keto-1,4-bis-dehydro, or a 3-hydroxy (α and β)-4-dehydro system.

Representative of the preferred compounds of this invention are 10-hydroperoxy-4-estrenes (i.e. compounds of Formula I wherein W is methyl) and, particularly, those wherein Z is an ethinyl function, such as 10-hydroperoxy-17α - ethinyl-4-estren-17β-ol-3-one and 10-hydroperoxy-17α-ethinyl-4-estrene-3β,17β-diol, the 3α-epimer thereof, as well as their acetate ester derivatives. In general, the 3-keto compounds are the compounds of choice since, in addition to being therapeutically valuable per se, they are useful as intermediates in preparing the corresponding 3-hydroxy derivatives of this invention.

Other species of preferred compounds wherein W is methyl and A is oxygen are the following:
10-hydroperoxy-4-estren-17β-ol-3-one and the 10-acetate thereof,
10-hydroperoxy-17α-methyl-4-estren-17β-ol-3-one and the 10 acetate thereof, 10-hydroperoxy-17α-ethyl-4-estren-17β-ol-3-one and the 10-acetate thereof, 10-hydroperoxy-17α-chloroethinyl-4-estren-17β-ol-3-one and the 10-acetate esters thereof.

In order to prepare the novel 3-keto-10-hydroperoxy-13-alkyl-gonanes of this invention, we employ the oxidation process aspect of this invention, i.e. subjecting a 3-keto-13-alkyl-β(γ)-unsaturated-gonane to the action of oxygen in the presence of light as depicted in the following reaction schemes:

(A)
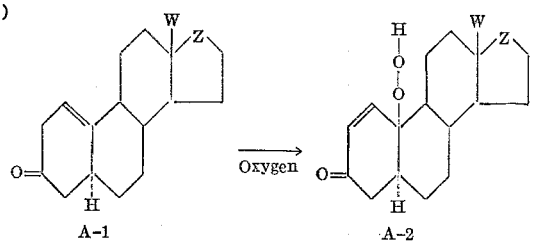

(B)
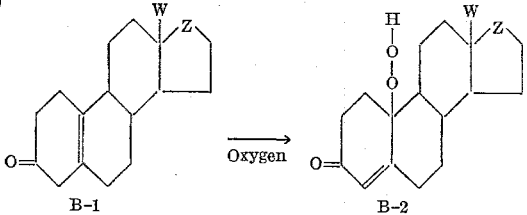

The reaction is effected in solution, the solvent being one inert to the reactants under the conditions of the transformation. Suitable solvents are the halogenated hydrocarbons such as chloroform or methylene chloride; nitrogen containing solvents such as pyridine or dimethylformamide, and hydrocarbon solvents such as benzene, hexane, or others such as carbon disulfide or alcohols such as ethanol. The oxygen source may be a stream of oxygen itself, a stream of air, or simply the presence of the oxygen in the air. In our process there may advantageously be employed free radical initiators such as benzoyl peroxide, azoisobutyronitrile or oxygen carriers such as hematoporphyrin. The reaction is usually carried out by bubbling the oxygen source through the solution of the 3-keto-β(γ)-unsaturated-13-alkyl-gonane while illuminating the reaction vessel with white light such as from a common fluorescent lamp.

The starting material for reaction sequence A, a 3-keto-13-alkyl-5α-1(10)-gonane, if not already known may be prepared by the following reaction scheme (C):

(C)
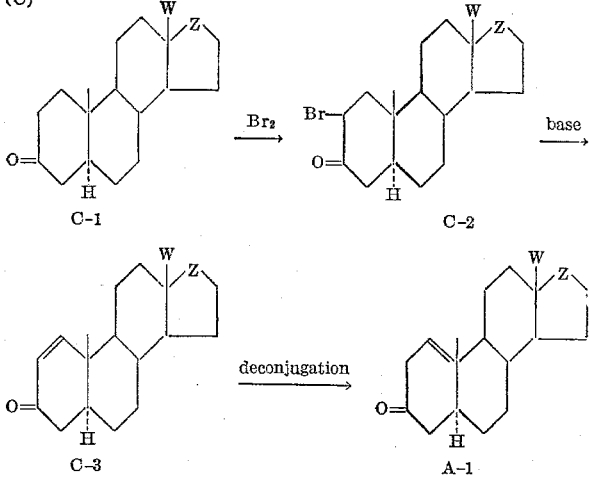

In reaction scheme C, by starting with an appropriately substituted 3-keto-5α-estrane (i.e. a 3-keto-13-methyl-5α-gonane) (C-1), such as for example 17α-ethinyl-5α-estrane-17β-ol-3-one, and brominating according to known techniques there is produced the corresponding 2-bromo intermediate,

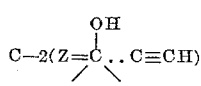

which upon reaction with a dehydrobrominating agent such as collidine or dimethylformamide in the presence of lithium chloride or lithium carbonate, yields the α(β)-unsaturated ketone, C-3 (e.g. 17α-ethinyl-5α-1-estren-17β-ol-3-one). Deconjugation is effected by reacting C-3 under nitrogen with sodium acetylide in the presence of dimethylformamide or dimethylsulfoxide or with other reagents such as potassium-tertiary-butoxide in dimethylsulfoxide whereby the 3-keto-5α-1(10)-estrene, A-1 (e.g. 17α-ethinyl-5α-1(10)-estren-17β-ol-3-one), is produced and utilized as starting material in reaction scheme A.

Reaction scheme C is general for the production of 3-keto-13-alkyl-5α-1(10)-gonenes (e.g. 3-keto-5α-1(10)-estrenes) which serve as starting material for the synthesis of a 3-keto-10-hydroperoxy-13-alkyl-5α-1-gonene (e.g. 3-keto-10-hydroperoxy-5α-1-estrene). It may not be necessary to utilize the entire sequence C, depending upon the availability of precursors. For example, in the 5α-estrane series, starting steroids of structure A-1 such as 5α-1(10)-estrene-17β-ol-3-one are known in the literature. Also known are 3-keto-17α-R-17β-OR'-5α-1-estrenes of structure C-3 wherein R represents H or lower alkyl and R' represents H or lower alkanoyl; for example, 5α-1-estrene-17β-ol-3-one, 17α-methyl-5α-1-estren-17β-ol-3-one, 17α-ethinyl-5α-1-estren-17β-ol-3-one and the 17-acetate esters thereof. These latter materials only require the deconjugation step of sequence C for transformation into a 1(10)-dehydro starting material for reaction scheme A.

In some instances a 3-keto-5α-estrane, exemplified by C-1 may not be readily available. These can be prepared, however, from 3-keto-4-estrenes by hydrogenation of the A-ring such as by lithium in ammonia followed by bromination at the 2-position and ultimate dehydrobromination and deconjugation as described above in reaction sequence C.

Thus, for example, 17α-methylethinyl-4-estren-17β-ol-3-one (i.e. 17α-methylethinyl-19-nor-4-androsten-17β-ol-3-one) and 17α-ethyl-4-estren-17β-ol-3-one, upon reduction with lithium in ammonia yields 17α-methylethinyl-5α-estran-17β-ol-3-one and 17α-ethyl-5α-estran-17β-ol-3-one respectively, each of which upon bromination at C-2 followed by dehydrobromination and ultimate deconjugation of the resulting 3-keto-1(2)-dehydro-5α-intermediates (C-3) yields the starting compounds 17α-methylethinyl-5α-1(10)-estren-17β-ol-3-one and 17α-ethyl-5α-1(10)-estren-17β-ol-3-one, respectively.

It is apparent to one skilled in the art that starting material of general structure A-1 including substitution analogs thereof are derived according to the foregoing procedures and obvious variations thereof as suggested by the art. It is also apparent to one skilled in the art that protective groups for reactive substituents may be required in these sequences of reactions as in other reactions of the art. Protective groups such as esters, ketals, etc. may be introduced and removed as required according to known techniques.

Of the 3-keto-13-alkyl-5(10)-gonenes which are the starting materials for reaction scheme B, for the most part the 3-keto-5(10)-estrenes, i.e. the 3-keto-13-methyl-5(10)-gonenes are known (especially those devoid of substituents other than those required in the D-ring). Others are prepared from the corresponding estrone methyl ether analog utilizing known procedures. Representative of known starting materials are 5(10)-estrene-17β-ol-3-one, 17α-vinyl-5(10)-estrene-17β-ol-3-one, 17α-methyl-5(10)-estrene-17β-ol-3-one (and the corresponding 17α-ethyl and 17α-propyl analogs), 17α-ethinyl-5(10)-estrene-17β- ample, treatment of 17α-methyl-5(10),9(11)-estradien-17β-ol-3-one with oxygen according to the process of this application followed by acetylation of the corresponding 10-hydroperoxy-4,9(11)-estradiene thereby formed will yield 17α - methyl - 10 - hydroperoxy-17α-methyl-4,9(11)-estradien-17β-ol-3-one 10-acetate which, upon treatment with hypobromous acid, gives rise to 9α-bromo-10-hydroperoxy - 17α - methyl-4-estrene-11β,17β-diol-3-one 10-acetate. Utilizing known procedures such as with potassium acetate in acetone will transform the aforementioned 9α-bromo-11β-hydroxy analog to the corresponding 9β,11β-epoxy which when treated with either hydrogen fluoride or hydrogen chloride yields the corresponding halohydrin, i.e. 9α-fluoro- and 9α-chloro-10-hydroperoxy-17α - methyl - 4-estrene-11β,17β-diol-3-one 10-acetate, respectively. Alternatively, after esterification, 10-hydroperoxy-17α-methyl-4,9(11)-estradien-17β-ol-3-one 10-acetate may be treated with halogen according to processes such as described in U.S. Patents 3,009,938 and 3,049,554 whereby halogen is introduced at the 9α- and 11β- positions.

When preparing 4-dehydro derivatives of Formula I wherein A is oxygen and W is a lower alkyl other than methyl, e.g. ethyl, propyl and the like, one may utilize the known intermediate (B–1) 13-ethyl-17α-ethinyl-5(10)-gonen-17β-ol-3-one, which, when subjected to the action of oxygen according to our novel process as outlined in reaction scheme B, will be transformed to 10-hydroperoxy-13-ethyl-17α-ethinyl-4-gonen-17β-ol-3-one. Other 13-ethyl (or higher homologs thereof)-5(10)-gonen-3-one intermediates (B–1) may be prepared from 3-methoxy-13-ethyl (or higher homologs thereof)-1,3,5(10)-gonatrienes utlizing procedure D as outlined hereinabove. Thus, for example, 3-methoxy-13-ethyl-1,3,5(10)-gonatrien-17-one (intermediate D-1 wherein W is ethyl and Z is >C=O) when subjected to a Birch reduction following reaction sequence D is converted to 3-methoxy-13-ethyl-2,5(10)-gonadien-17β-ol (D-2) which upon treatment with sulfuric acid in methanol will yield the desired starting steroid 13-ethyl-5-(10)-gonen-17β-ol-3-one ($B_1$ wherein W is ethyl and Z is H,βOH). Treatment of the latter compound according to our precess will yield the novel 10-hydroperoxy-13-ethyl-4-gonen-17β-ol-3-one, a 3-keto-Δ⁴-derivative defined by Formula I.

Alternatively, the known 3-methoxy-13-ethyl-1,3,5(10)-gonatrien-17-one may first be converted to the 17α-methyl-17β-hydroxy analog by reaction with a Grignard reagent such as methyl magnesium iodide to give 3-methoxy-13-ethyl-17α-methyl-1,3,5(10)-gonatrien - 17β - ol which when subjected to the reactions outlined in sequence D is converted first to 3-methoxy-13-ethyl-17α-methyl-2,5(10)-gonadien-17β-ol (D-2) and thence to 13-ethyl-17α-methyl-5(10)-gonen-17β-ol-3-one (B-1) which upon treatment with oxygen according to our process will yield 10-hydroperoxy-13-ethyl-17α-methyl-4-gonen-17β-ol-3 - one. When other similar reagents such as ethyl lithium are substituted for methyl magnesium bromide in the aforedescribed procedure, there is obtained the corresponding higher homolog at C–17, 3-methoxy-13,17-bis-ethyl-5(10)-gonen-17β-ol-3-one (B–1) convertible with oxygen to 10 - hydroperoxy-13,17α-di-ethyl-4-gonen-17β-ol-3-one of Formula B–2.

When preparing a 17α-ethinyl or 17α-substituted-ethinly-3-keto-5(10)-gonene starting compound (B–1) by procedure D, it is necessary to introduce the 17-ethinyl group after the Birch reduction otherwise the C–17 unsaturated side chain will be reduced. Thus, for example, 3-methoxy-13-ethyl-2,5(10)-gonadien-17β-ol (prepared by the Birch reduction of 3-methoxy-13-ethyl-1,3,5(10)-gonatrien-17-one) is oxidized with aluminum isopropoxide with cyclohexanone and the resulting 3-methoxy-13-ethyl-2,5(10)-gonadien-17-one (intermediate D–2 wherein W is ethyl and Z is >C=O) is alkynated with reagents such as sodium methyl acetylide and lithium chloroacetylide and lithium chloroacetylide to obtain 3-methoxy-13-ethyl-17α-methylethinyl-2,5(10)-gonadien-17β-ol (D–2 with W=$C_2H_5$ and

and 3-methoxy-13-ethyl-17α-chloro-ethinyl-2,5(10)-gonadien-17β-ol (D–2 with W=$C_2H_5$ and

Treatment of each of these intermediates with mild acid yields the desired 5(10)-gonene intermediate (B–1), 13-ethyl-17α-methylethinyl-5(10)-gonen-17β-ol - 3 - one and 13-ethyl-17α-chloroethinyl-5(10)-gonen-17β-ol-3-one, respectively, which are convertible via the action of oxygen according to our process to 10-hydroperoxy-13-ethyl-17α-methylethinyl-4-gonen-17β-ol-3-one and 10-hydroperoxy-13-ethyl-17α-chloroethinyl-4-gonen-17β-ol-3-one of Formula B–2.

In order to obtain the 13-higher homologs of the 3-keto-10-hydroperoxy-1-dehydro-5α-gonenes of our invention i.e. compounds such as those of Formula A–2 wherein the lower alkyl group W has at least 2 carbon atoms) the necessary starting compounds of structure A–1 (wherein W is ethyl or a higher homolog thereof) are prepared from 3-keto-13-alkyl-5α-gonanes according to procedure D in a manner simlar to that described for the estrane (13-methyl-5α-gonane) series. The saturated gonane starting steriods (C–1) for reaction scheme C are obtained by acid treatment of either a 17-Z-3-methoxy-13-lower alkyl-2,5(10)-gonadiene-(D–2) or a 17-Z-13-lower alkyl-5(10)-gonen-3-one(B–1) followed by a lithium in ammonia reduction of the 3-keto-13-alkyl-4-gonen (E–1) thereby produced. This sequence of reactions is outlined below as process E.

(E.)

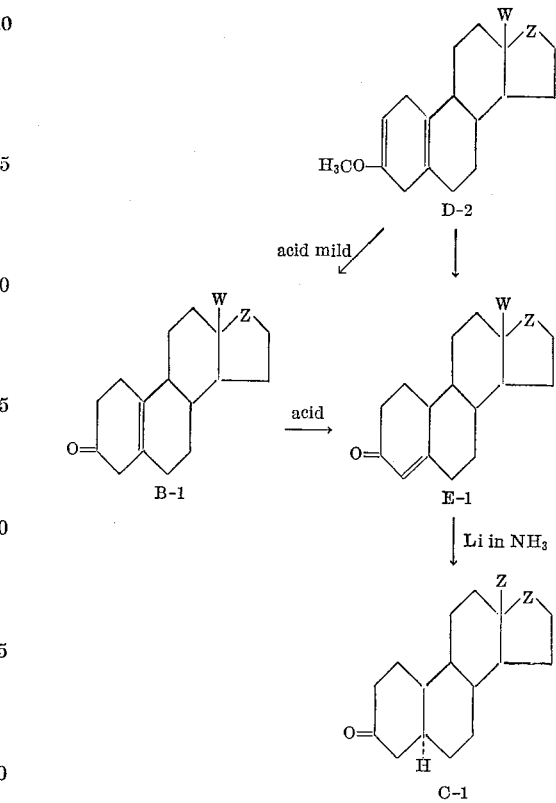

Thus, for example, 13-ethyl-17α-ethinyl-4-gonen-17β-ol-3-one (E–1) is prepared either by acid treatment such as with sulfuric or hydrochloric acid in methanol of 3-methoxy - 13 - ethyl-17α-ethinyl-2,5(10)-gonadien-17β-ol ol-3-one and the corresponding 17α-chloroethinyl and 17α-trifluoromethyl-ethinyl analogs, as well as 13-ethyl-17α-ethinyl-5(10)-gonene-17β-ol-3-one.

When a 13-alkyl-5(10)-gonene-3-one starting compound is unavailable it may be conveniently prepared from a 3-methyl-13-ethyl-1,3,5(10)-gonatriene via the well-known Birch reduction followed by hydrolysis with a weak acid such as acetic acid. Reaction sequence D is indicative of this transformation, with W and Z being as heretofore defined:

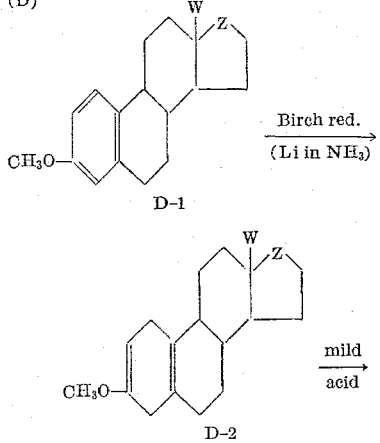

In reaction scheme D, the 13-alkyl-1,3,5(10)-gonatriene methyl ether, D-1, is of necessity limited in the variable Z since the Birch reduction will also affect reducible groups such as keto or alkynyl. In order to prepare such 3-keto-13-alkyl-5(10)-gonenes (B-1) via reaction scheme D, Z must represent

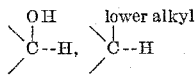

or >C=O. When Z is >C=O, this function is reduced in the reaction so that in the resulting intermediate (D-2) Z is

Oxidation of the thus formed 17β-hydroxyl group in D-2 via an Oppenauer oxidation results in a 17-keto analog which may then be subjected to Grignard reaction or reaction with alkali metal acetylides to yield either the 17β-hydroxy-17α-lower alkyl or 17β-hydroxy-17α-alkynyl analogs of D-2, respectively, i.e. those compounds wherein Z is

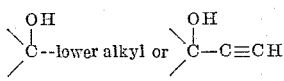

Hydrolysis of D-2 with mild acid such as dilute hydrochloric acid or acetic acid gives rise to the 3-keto-13-alkyl-5(10)-gonene starting steroid, B-1. When preparing a 5(10)-gonene intermediate wherein Z is a ketone function, e.g. 5(10)-estrene-3,17-dione, after reduction of estrone methyl ether with lithium in ammonia according to the first step of procedure D, the resulting intermediate D-2 (2,5(10)-estradiene-3,17β-diol 3-methylether) must first be subjected to an alkaline oxidation medium according to known techniques e.g. aluminum isopropoxide with cyclohexanone in order to oxidize the reduced function at C-17 to obtain 3-methoxy-2,5(10)-estradiene-17-one (compound D-2 wherein Z is >C=O) prior to treatment with mild acid whereby is obtained the desired 3-keto-5(10)-estrene of structure B-1, i.e. 5(10)-estrene-3,17-dione.

Reaction scheme D is particularly applicable to the synthesis of 11-hydroxy or 11-keto analogs. Thus, for example, 11β-hydroxyestrone methyl ether (D-1 with an 11β-hydroxy group wherein Z is >C=O and W is methyl) may be attacked according to two paths. The ketone at C-17 may first be transformed via Grignard reagents to give 3-methoxy-17α-methyl-1,3,5(10)-estratriene-11β,17β-diol. The A-ring may then be transformed to the desired 3-keto-5(10)-dehydro configuration by the process outlined under D to give 17α-methyl-5(10)estrene-11β,17β-diol-3-one. Preferably, oxidation of the 11-hydroxy group to 11-keto or dehydration to the corresponding 9(11)-dehydro analog is effected after introduction of the 10-hydroperoxy group by our novel process and formation of a 10-lower alkanoate ester of the 3-keto-10-hydroperoxy estrene thereby formed. Alternatively, transformation of the A-ring may be effected prior to that on the 17-keto group. Thus, for example, 11β-hydroxyestrone methylether (of structure D-1) upon reaction with lithium in ammonia according to the first step of process D, is converted to 3-methoxy-2,5(10)-estradiene-11β,17β-diol (an intermediate of structure D-2 having an 11β-hydroxyl group and wherein W is methyl and Z is

Basic oxidation, such as with aluminum isopropoxide with cyclohexanone, conveniently converts the 17β-hydroxy function to a 17-keto group thereby preparing an intermediate, D-2, wherein Z is >C=O, i.e. 3-methoxy-2,5(10)-estradiene-11β-ol-17-one. Treatment of the 17-keto intermediate D-2 with either sodium acetylide in dimethylsulfoxide or a Grignard reagent such as methyl magnesium iodide will yield the corresponding D-2 intermediates wherein Z is

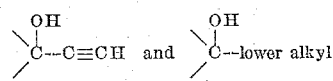

respectively, i.e. 3-methoxy-17α-ethinyl-2,5(10)-estradien-11β, 17β-diol and 3-methoxy-17α-methyl-2,5(10)-estradiene-11β,17β-diol. Reaction of the foregoing with mild acid according to the second step of procedure D, yields intermediates which are 11-hydroxy analogs of (B-1) 17α-ethinyl-5(10)-estrene-11β,17β-diol-3-one and 17α-methyl-5(10)-estrene-11β,17β-diol-3-one, respectively. The choice of modes depends upon the type of substituent desired at C-17. As indicated heretofore, it sometimes is advantageous to effect transformation at C-17 (and C-11) prior to acting upon the A-ring since these former groups may be reactive to the Birch reduction and hydrolysis.

In the 17α-ethinyl group of the 3-keto-10-hydroperoxy-4-estrene compounds, the 9 and/or 11 position substituted derivatives may be obtained from the known 17α-ethinyl-5(10), 9(11)-estradien-17β-ol-3-one. This material permits the formation of 9,11-dihalogeno analogs, 9α-halo-11β-hydroxy (and 11-keto analogs) and the like according to known procedures, preferably after hydroperoxidation at C-10 and esterification of the 10-hydroperoxy function. Similarly, the 9 and/or 11-substituted derivatives of 10-hydroperoxy-4-estren-17β-ol-3-one are obtained from the known 5(10),9(11)-estradien-17β-ol-3-one and esters thereof.

In preparing 9 and/or 11-substituted 3-keto-10-hydroperoxy-4-estrenes of this invention, the desired 3-keto-5(10),9(11)-estradiene intermediate may be prepared from the corresponding 3-keto-4,9(10)-estradiene according to known procedures. Thus, for example, reaction of each of 17α-methyl-4,9-estradien-17β-ol-3-one, 17α-vinyl-4,9-estradien-17β-ol-3-one and 17α-chloroethinyl-4,9-estradien-17β-ol-3-one with pyrrolidine followed by hydrolysis of the 3-pyrrolidylenamine thereby produced will form 17α-methyl-5(10),9(11)-estradien-17β-ol-3-one, 17α-vinyl-5(10),9(11)-estradien-17β-ol-3-one and 17α-chloroethinyl-5(10),9(11)-estradien-17β-ol-3-one. From these starting compounds, there may be introduced substituents at C-9 and at C-11 in a manner similar to that described in Examples 5-7 of this application. For ex- (D-2 prepared as in Example 14C of this application) or by similar acid treatment of the known 13-ethyl-17α-ethinyl-5(10)-gonen-17β-ol-3-one (B-1 which in turn may be derived by mild acid treatment of the corresponding 3-methoxy-2,5(10)-gonadiene. Reduction with lithium in ammonia of 13-ethyl-17α-ethinyl-4-gonen-17β-ol-3-one (E-1) yields the desired 13-ethyl-17α-ethinyl-5α-gonan-17β-ol-3-one (C-1) which upon bromination, followed by dehydrobromination and deconjugation of the thereby produced 13-ethyl-17α-ethinyl-5α-1-gonen-17β-ol-3-one (C-3) according to the procedure outlined under reaction scheme C yields the starting intermediate 13-ethyl - 17α - ethinyl - 5α-1(10)-gonen-17β-ol-3-one (A-1) convertible upon treatment with oxygen according to our process to 10 - hydroperoxy - 13 - ethyl-17α-ethinyl-5α-1-gonen-17β-ol-3-one (A-2).

It is apparent from the foregoing that the necessary precursor for preparing both the 3-keto-5α-1-gonene (A-1) and 3-keto-4-gonene (B-1) starting compounds of our process are 3-methoxy-13-W-17-Z-2,5(10)-gonadienes of Formula D-2 which are, in turn, derived from the the 3-methoxy -13-W-17-Z-1,3,5(10) - gonatrienes of Formula D-1 which have been described in detail for those compounds wherein W is methyl and ethyl. The higher homologs of the compounds of structure D-1, i.e. those wherein W is n- or iso-propyl, n- or iso-butyl, and the like, are prepared by reduction of the corresponding 8,14-bis-dehydro analogs according to procedures described by H. Smith et al., Experientia 19, 394 (1963). Thus, 3-methoxy - 13 - n - propyl-1,3,5(10),8,14-gonapentaen-17-one and the corresponding 13-n-butyl analog thereof, upon selective hydrogenation with a 2% palladized calcium carbonate catalyst in benzene yields the corresponding 1,3,5(10),8-tetraenes which are converted by known procedures such as that utilizing lithium in aniline with liquid ammonia to give 3-methoxy-13-n-propyl-1,3,5(10)-gonatrien-17β-ol (D-1) and the 13-n-butyl analog thereof which may be converted to the corresponding 17-keto compound by oxidation utilizing the Jones reagent. Reaction of these 13-n-propyl and 13-n-butyl precursors according to sequences C, D, E, and others as herein described yields 17 - Z - 13-n-propyl-10-hydroperoxy-5α-1-gonenes and 4-gonenes of Formula I.

The 3 - keto - 10-hydroperoxy-1,4-bis-dehydro-gonanes and derivatives thereof for Formula I are preferably obtained by dehydrogenation of the corresponding 3-keto-Δ⁴-gonene-10-lower alkanoate via chemical procedures. Thus, 10 - hydroperoxy-17α-ethinyl-4-estren-17β-ol-3-one 10-acetate upon treatment with dichlorodicyanobenzoquinone in dioxane will yield 10-hydroperoxy-17α-ethinyl-1,4-estradien-17β-ol-3-one 10-acetate convertible upon hydrolysis with potassium bicarbonate in methanol to the free hydroperoxide derivative.

By the oxidation process aspect of this invention (previously described in detail) a 3-keto-10β-hydroperoxy-13-alkyl-4-gonene of this invention is prepared by subjecting a 3-keto-13-alkyl-5(10)-gonene to the action of oxygen in the presence of light. Similarly, by the oxidation process of this invention, a 3-hydroxy (α and β)-10-hydroperoxy-13-alkyl-4-gonene may be prepared by subjecting a solution of 3-hydroxy-13-alkyl-5(10)-gonene to the action of oxygen in the presence of light as shown hereinbelow in reaction scheme F (W and Z being as defined hereinabove).

(F)

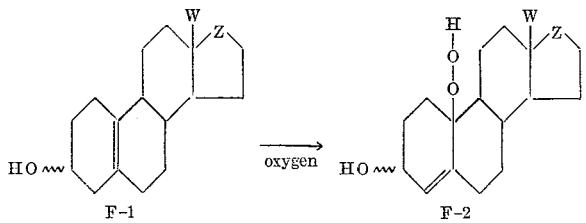

In the above formula, the wavy line ( ∽ ) at C-3 indicates that both the alpha and beta hydroxy derivatives are included.

In above reaction F, in order to effect conversion in high yields of a 3-hydroxy-13-alkyl-5(10)-gonene to a 3-hydroxy-10-hydroperoxy-13-alkyl-4-gonene, it is advantageous that a reaction "promotor" such as hematoporphyrin be present in the illuminated reaction solution when oxygen is being introduced; whereas in reaction B, high yield conversions of a 3-keto-13-alkyl-5(10)-gonene to a 3-keto-10-hydroperoxy-13-alkyl-4-gonene may be obtained without the use of promotors. As in reaction schemes A and B, reaction "promotors" which may be used are free radical initiators such as benzoyl peroxide and azoisobutyronitrile or oxygen carriers such as hematoporphyrin.

As in reactions A and B, the introduction of the 10β-hydroperoxy group into a 3 - hydroxy - 13 - alkyl - 5(10)-gonene is effected in solution, the solvent being one inert to the reactants under the conditions of the transformation.

Some of the 3-hydroxy-13-alkyl-5(10) gonene intermediates are known, for example, 5(10)-estrene-3α,17β-diol and 5(10) - estrene - 3β,17β-diol. Those 3-hydroxy-13-alkyl-5(10)gonenes which are not available may be prepared from the corresponding 3 - keto - 13 - alkyl - 5(10)-gonenes (described hereinabove with reference to reaction sequence B) by reduction with an alkyl metal borohydride in alcohol utilizing techniques similar to those known in the art. In this reduction an epimeric product mixture is formed containing 3α - hydroxy - 13 - alkyl-5(10)-gonene- and 3β-hydroxy-13-alkyl-5(10)-gonene derivatives, with the 3α-hydroxy epimer usually predominating. These epimers are separable utilizing known techniques such as fractional crystallization and/or chromatographic techniques.

In a preferred embodiment of this process of our invention, (i.e. reaction sequence F) 10-hydroperoxy-17α-ethinyl-4-estrene-3α,17β-diol is prepared by bubbling oxygen through a solution of 17α-ethinyl-5(10)-estrene-3α,17β-diol in pyridine containing hematoporphyrin irradiated with fluorescent light. Isolation of the resulting 3-hydroxy-10-hydroperoxy-4-estrene derivative is effected by pouring the reaction mixture into dilute hydrochloric acid and extracting with methylene chloride. Purification is effected by chromatographing over silica gel eluting with ether-acetone.

The above described oxidation process is usually preferred when a 3α-hydroxy-10-hydroperoxy-13-alkyl-4-gonene is desired, since the reduction process aspect of this invention, i.e. the reduction of a 3-keto-10-hydroperoxy-13-alkyl-4-gonene to the 3-hydroxy-10-hydroperoxy derivative, produces mainly the 3β-hydroxy epimers of this invention.

In the aforementioned reduction process aspect of this invention whereby the novel 3-hydroxy-10-hydroperoxy-13-alkyl-4-gonenes are prepared by the reduction of a 3-keto-10-hydroperoxy-13-alkyl-4-gonene in alcohol by means of an alklai metal borohydride, techniques are used similar to those known in the art for the reduction of a 3-carbonyl function. It is unexpected, however, that the 10-hydroperoxy function remains unchanged under the conditions of this process since hydroperoxy groups are known to be readily reducible to hydroxy upon treatment with sodium borohydride.

The preferred compounds of this invention possess a free 10-hydroperoxy group (i.e. those compounds of Formula I wherein R' is hydrogen). It is advantageous, therefore, when preparing a 3-hydroxy-10-hydroperoxy compound by the aforementioned reduction process aspect, that it is possible to directly reduce a 3-keto-10-hydroperoxy-13-alkyl-4-gonene to a 3-hydroxy-10-hydroperoxy-13-alkyl-4-gonene of Formula I without having to first protect the 10-hydroperoxy group (by esterification, for example) prior to reduction with sodium borohydride, which would necessitate reconversion of the 10-peroxy ester to the free 10-hydroperoxy function in the resulting 3-hydroxy reduction product. Indeed, we have found that our reduction process gives higher yields of a purer 3-hydroxy product when the starting compound has a 10-hydroperoxy function rather than a derivative thereof, such as a 10-alkanoate ester.

Prior to reduction with sodium borohydride, for example, any keto group other than at C–3 in the 4-gonene starting compound (such as at C–6) is preferentially converted via known techniques to a protective derivative thereof such as a ketal derivative.

In the reduction process aspect of our invention, the preferred reagent/solvent mixture is sodium borohydride in a lower alkanol: the solvent of choice being methanol. When other lower alkanols are used as solvent competing reactions occur, thus diminishing the yield of the desired 3-hydroxy-10-hydroperoxy-13-alkyl-4-gonenes. In general, to each mole of 3-keto-10-hydroperoxy-4-gonene to be reduced, there is conveniently used at least one mole of alkali metal borohydride, e.g. sodium borohydride and, preferentially, from two to three moles. When reducing a 3,17-diketo-10-hydroperoxy-4-gonene, however, less than one mole (and preferably about one equivalent) of sodium borohydride is desirable.

In the aforedescribed process, the resultant product is an epimeric mixture of 3$\beta$-hydroxy and 3$\alpha$-hydroxy isomers, the predominating isomeric form being assigned the 3$\beta$-configuration since it is known in the art that upon reduction of a 3-keto-10-substituted-$\Delta^4$-system with an alkali metal borohydride there is obtained mainly the 3$\beta$-isomeric form of the resulting 3-hydroxy-10-substituted-$\Delta^4$-product.

The epimeric mixture of 3$\alpha$-hydroxy- and 3$\beta$-hydroxy-10-hydroperoxy-13-alkyl-4-gonene is conveniently isolated by evaporating the reaction mixture to a residue followed by extraction with a suitable solvent. Solvents which may conveniently be used for isolating the 3-hydroxy-$\Delta^4$-product are halogenated hydrocarbons such as chloroform or methylene chloride, hydrocarbon solvents such as benzene, or other solvents such as ethyl acetate. The 3$\alpha$- and 3$\beta$-epimers may then conveniently be separated by fractional crystallization of the epimeric mixture or by chromatography utilizing known techniques. Usually, when fractional crystallization methods are used, the 3$\beta$-hydroxy-10-hydroperoxy epimer precipitates first with the smaller fraction, i.e. the 3$\alpha$-hydroxy-10-hydroperoxy epimer, remaining in solution. The 3$\alpha$-hydroxy epimer is then isolated by utilizing chromatographic techniques or by crystallization from a solvent mixture such as acetone-hexane.

In a preferred embodiment of the above-described process of our invention, 10-hydroperoxy-17$\alpha$-ethinyl-4-estrene-3,17$\beta$-diol is prepared by treating for ninety minutes a methanolic solution of 10-hydroperoxy-17$\alpha$-ethinyl-4-estren-17$\beta$-ol-3-one at room temperature with up to two or three molar equivalents of sodium borohydride per mole of steroid. After destroying any unreacted sodium borohydride with acetic acid, and evaporating the reaction mixture to a residue, the epimeric product mixture of 10-hydroperoxy-17$\alpha$-ethinyl-4-estrene-3,17$\beta$-diol is isolated by extraction with ethyl acetate and concentration of the extracts to a residue. Separation of the epimeric mixture is then effected by crystallization from chloroform, the 3$\beta$-hydroxy-epimer, i.e. 10-hydroperoxy-17$\alpha$-ethinyl-4-estrene-3$\beta$,17$\beta$-diol, precipitating first. The corresponding 3$\alpha$-hydroxy epimer is obtained by concentrating the chloroform filtrate of the 3$\beta$-hydroxy compound, and crystallizing the resultant residue with acetone-hexane.

The necessary starting compounds of this reduction process aspect are the 3-keto-10-hydroperoxy-13-alkyl-4-gonenes of this invention, i.e. those compounds of Formula I wherein A is oxygen, which are prepared as described hereinabove.

It is to be noted that when preparing the novel 3-hydroxy-10-hydroperoxy-13-alkyl-4-gonenes by the first process aspect of this invention (i.e. by the action of oxygen on 3-hydroxy-13-alkyl-5(10)-gonene) the 3-hydroxy function is introduced into the 5(10)-gonene nucleus prior to introduction of the 10-hydroperoxy group; whereas in the second process aspect of our invention (i.e. the borohydride reduction of a 3-keto-10-hydroperoxy compound) the 10-hydroperoxy group is introduced into the 4-gonene nucleus prior to reduction of the 3-keto group to a 3-hydroxy function.

To prepare a 10-mono-ester of this invention, a pyridine solution of an unesterified compound of this invention, (i.e. wherein R and R' represent hydrogen and A is oxygen or H, OH as exemplified by 17$\alpha$-ethinyl-10-hydroperoxy-4-estrene-3$\beta$,17$\beta$-diol and 17$\alpha$-ethinyl-10-hydroperoxy-4-estren-17$\beta$-ol-3-one) are each treated at about 0° C. with about a molar equivalent of a hydrocarbon carboxylic acid anhydride (e.g. lower alkanoic acid anhydrides such as acetic anhydride and propionic anhydride) or with an acid halide of a hydrocarbon carboxylic acid (e.g. benzoyl chloride) whereby is obtained a 3,17-dihydroxy-4-gonene or a 3-keto-17-hydroxy-4-gonene of this invention having an esterified 10-hydroperoxy function, e.g. the 10-acetate, the 10-propionate, and the 10-benzoate, respectively, of 17$\alpha$-ethinyl-10-hydroperoxy-4-estrene-3$\beta$,17$\beta$-diol or 17$\alpha$-ethinyl-10-hydroperoxy-4-estren-17$\beta$-ol-3-one. If, in the above esterification procedure, there is used approximately two moles or more of acid anhydride or acid chloride in the case of the 3-hydroxy derivatives, i.e. those compounds wherein A is (H,OH), the 3,10-di-ester forms, i.e. a 3-acyloxy-17$\beta$-hydroxy-4-gonene having an esterified 10-hydroperoxy derivative, e.g. the 3,10-diacetate, the 3,10-dipropionate and the 3,10-dibenzoate, respectively, of 10-hydroperoxy-17$\alpha$-ethinyl-4-estrene-3,17$\beta$-diol; whereas, in the case of the 3-keto derivatives of this invention, there would still be obtained the 10-mono-ester.

When a 17-monoacyloxy derivative of this invention is desired (i.e. a compound of Formula I wherein R' and R'' represent hydrogen and R represents a hydrocarbon carbonyl, as exemplified by 10-hydroperoxy-17$\alpha$-ethinyl-4-estrene-3$\beta$,17$\beta$-diol 17-acetate and 10-hydroperoxy-17$\alpha$-ethinyl-4-estren-17$\beta$-ol-3-one 17-acetate), one may use either process aspect of this invention provided the 17-ester group is present in the starting compound prior to introduction of the 3$\beta$-hydroxy or 10-hydroperoxy group. Thus, by introducing oxygen into a fluorescent light illuminated pyridine solution of 17$\alpha$-ethinyl-5(10)-estren-17$\beta$-ol-3-one 17-acetate or 17$\alpha$-ethinyl-5(10)-estrene-3$\beta$,17$\beta$-diol 17-acetate in the presence of hematoporphyrin, there is introduced a 10-hydroperoxy group with a concomitant shift of the double bond to produce the desired 10-hydroperoxy-17$\alpha$-ethinyl-4-estren-17$\beta$-ol-3-one 17-acetate and 10-hydroperoxy-17$\alpha$-ethinyl-4-estrene-3$\beta$,17$\beta$-diol 17-acetate. Alternatively, by our other process, 10-hydroperoxy-17$\alpha$-ethinyl-4-estren-17$\beta$-ol-3-one 17-acetate upon reduction with sodium borohydride in methanol will produce an epimeric 3-hydroxy mixture of the 17-mono-acetate, i.e. of 10-hydroperoxy-17$\alpha$-ethinyl-4-estrene-3,17$\beta$-diol 17-acetate, separable to the respective 3$\alpha$-hydroxy and the 3$\beta$-hydroxy epimers.

The requisite 17$\beta$-acetoxy-17$\alpha$-ethinyl starting compounds for both the aforedescribed procedures for preparing a 17-mono-acetate of Formula I are derived from 3-methoxy-17$\alpha$-ethinyl-2,5(10)-estradien-17$\beta$-ol 17-acetate which, upon treatment with oxalic acid according to known techniques, yields 17$\alpha$-ethinyl-5(10)-estren-17$\beta$-ol-3-one 17-acetate which, in turn, upon reduction with sodium borohydride in methanol, yields 17$\alpha$-ethinyl-5(10)-estrene-3,17$\beta$-diol 17-acetate, both of which are precursors for the oxygenation process aspect of this invention. Alternatively, oxygenation of the intermediate 17$\alpha$-ethinyl-5(10)-estren-17$\beta$-ol-3-one 17-acetate in carbon tetrachloride solution as described in Example 27C yields 10-hydroperoxy-17α-ethinyl-4-estren-17β-ol-3-one 17-acetate which may then be reduced via the reduction process aspect of this invention, to give 10-hydroperoxy-17α-ethinyl-4-estrene-3,17β-diol 17-acetate.

The precursor for the 17-mono-acetate derivatives, i.e. 3-methoxy-17α-ethinyl-2,5(10)-estradien-17β-ol 17-acetate is conveniently prepared from 3-methoxy-2,5(10)-estradien-17-one, by reaction with acetic acid anhydride and sodium acetylization in dimethylformamide under an atmosphere of nitrogen as described in Example 27A of this application and in copending application of Elliot L. Shapiro, Serial No. 533,435 filed March 11, 1966. It is apparent in the above described conversions that by substituting other lower alkanoic anhydrides such as caproic and caprylic anhydrides, there is obtained the corresponding 17-caproate and 17-caprylate, respectively, of 3-methoxy - 17α - ethinyl - 2,5(10)-estradien-17β-ol from whence may be derived the 17-caproate and 17-caprylate respectively of 10-hydroperoxy - 10 - hydroperoxy-17α-ethinyl-4-estren-17β-ol-3-one and 10-hydroperoxy-17α-ethinyl-4-estrene-3,17β-diol of this invention.

When it is desired to prepare a 17-mono-ester of a compound of Formula I wherein Y is hydrogen, or lower alkyl, or lower alkenyl, the 17-hydroxy group in a 3-methoxy-13-alkyl-2,5(10)-gonadiene is usually esterified according to known procedures prior to introduction of the 3β-hydroxy group or the 10-hydroperoxy-Δ⁴- function via either of the process aspects of this invention. For example, 3-methoxy-2,5(10)-estradien-17β-ol upon reaction with acetic anhydride or benzoylchloride in pyridine at room temperature yields 3-methoxy-17β-acetoxy-2,5(10)-estradiene and 3-methoxy-17β-benzoyloxy-2,5(10)-estradiene, respectively, whereas 3-methoxy-17α-vinyl-2,5(10)-estradien-17β-ol and 3-methoxy-17α-methyl-2,5(10)-estradien-17β-ol upon reaction with acetic anhydride or benzoylchloride in pyridine at elevated temperatures will yield 3-methoxy-17α-vinyl-2,5(10)-estradien-17β-ol 17-acetate and 3-methoxy-17α-methyl-2,5(10)-estradien-17β-ol-3-one 17-acetate and the corresponding 17-benzoates, respectively. Treatment with oxalic acid in known manner of each of the foregoing 17-monoesters, followed by oxygenation of the resulting 3-keto-5(10)-estrene intermediate in a chloroform solution in the presence of light yields 10-hydroperoxy-4-estren - 17β - ol - 3 - one 17-acetate, 10-hydroperoxy-4-estren-17β-ol-3-one 17-benzoate, 10-hydroperoxy-17α-vinyl-4-estren-17β-ol-3-one 17-acetate, 10-hydroperoxy-17α-methyl-4-estren-17β-ol-3-one 17-acetate, 10-hydroperoxy-17α-vinyl-4-estren-3-one 17-benzoate and 10-hydroperoxy-17α-methyl-4-estren-17β-ol-3-one 17-benzoate, respectively. Reduction of each of the foregoing with sodium borohydride in methanol according to the reduction process aspect of this invention yields the novel 10-hydroperoxy-4-estrene-3,17β-diol 17-acetate, 10-hydroperoxy-4-estrene-3,17β-diol 17-benzoate, 10-hydroperoxy-17α-vinyl-4-estrene-3,17β-diol 17-acetate, 10-hydroperoxy-17α-methyl-4-estrene-3,17β-diol 17-acetate, 10-hydroperoxy-17α-vinyl-4-estrene-3,17β-diol 17-benzoate, and 10-hydroperoxy-17α-methyl-4-estrene-3,17β-diol 17-benzoate, respectively. Separation of the 3α-hydroxy and 3β-hydroxy epimers of the foregoing is effected by fractional crystallization or by chromatographic techniques as described herein.

It is apparent that depending upon what point in the process an ester group is introduced into the molecule, and by utilizing various esterification techniques known in the art, there can be prepared any variations of mono-, di-, and tri-esterified derivatives of 3-hydroxy-10-hydroperoxy-13-alkyl-4-gonenes defined by Formula I.

The 10-hydroperoxy - 3 - keto - gonenes and 10-hydroperoxy-3-hydroxy-4-gonenes of this invention are valuable novel compounds in that they are physiologically active per se or serve as valuable intermediates or building blocks in the formation of therapeutically effective substances. The preferred species of this invention are those compounds wherein Z represents

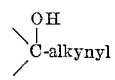

(the alkynyl being ethinyl, propargyl, halogenoethinyl, trifluoromethylethinyl) which are potent antifertility agents. Particularly valuable in this class is 10-hydroperoxy-17α-ethinyl-4-estren-17β-ol-3-one (i.e. 10-hydroperoxy - 13 - methyl - 17α - ethinyl - 4 - gonen - 17β - ol-3-one). This substance demonstrates anti-fertility activity when administered orally to the rat in dosages of about 6 mg./kg.

The 17β-hydroxy- and the 17α-alkinyl-17β-hydroxy-10-hydroperoxy-4-gonen-3-ones and 3-ols of this invention exhibit anti-gonadal hormonal properties such as demonstrated by their ability to depress secondary sex structures in both male and female animals thus making them useful for the treatment of prostatic hypertophy and for the regulation of gynocologic disorders, for example.

The compounds of this invention wherein Z is an alkenyl, and alkyl are to some extent progestational in their action making them of use, for example, in delaying the onset of heat in dogs and cats.

The 17α-alkyl analogs of the 3-keto- and 3-hydroxy-10-hydroperoxy-4-gonen-17β-ols of this invention also exhibit androgenic/anabolic activity. The 3,17-diones of Formula I are principally intermediates in the preparation of the aforementioned classes of substances.

The esters of the 3-keto- and 3-hydroxy-10-hydroperoxy-4-gonenes of this invention are of the same physiological utility as the unesterified compounds. In some instances, the esterification of the 10β-hydroperoxy function reduces potency, but the ester function at C-17 and/or C-3 may increase duration of activity.

In addition to the foregoing, the 10-hydroperoxy group is readily reduced to a 10-hydroxy group giving rise to compounds of known physiological activity such as 10-hydroxy-17α-ethinyl-4-estren-17β - ol - 3 - one. The presence of substituents elsewhere in the molecule such as methyl at C-6 or C-16 or oxygen at C-11 or halogen at C-9 and/or C-11 provides compounds having properties similar to the unsubstituted analogs, said properties varying principally rather than kind.

The physiologically active compounds of this invention, e.g. 10 - hydroperoxy-17α-ethinyl-4-estren-17β-ol-3-one and 10-hydroperoxy - 17α - ethinyl-4-estrene-3β,17β-diol, may be administered orally or parenterally, by incorporating a therapeutic dosage in conventional pharmaceutical form such as tablets, capsules, elixirs, suspensions, solutions, or the like. They can be administered in admixture with pharmaceutical excipients which are edible and which are chemically inert to the aforementioned 10-hydroperoxy-13-alkyl-4-gonene, exemplified by cornstarch, lactose, sucrose, gum arabic usually in admixture with an additive such as magnesium stearate, talc, and the like. Other compositions may be used such as fine powders or granules of 10-hydroperoxy-17α-ethinyl-4-estren-17β-ol-3-one and 10-hydroperoxy-17α-ethinyl-4-estrene-3β,17β-diol or derivatives thereof, which compositions may contain diluents and dispersing and surface active agents, and may be presented in a syrup, or in non-aqueous suspensions, in aqueous suspensions or in an oil.

The following examples are illustrative of the novel compounds of this invention and the methods of their preparation. They are not to be construed as limiting, the limits of the invention being defined by the appended claims.

PREPARATION A.—5(10)-ESTRENE-3,17-DIONE

Keep at room temperature for 40 minutes a solution of 200 mg. of 3-methoxy-2,5(10)-estradiene-17-one in 16 ml. of methanol and 3 ml. of water containing 250 mg.

of oxalic acid. Pour the reaction mixture into ice water, filter the resultant precipitate, wash with water, and dry to give 5(10)-estrene-3,17-dione. Purify by crystallization from ether-hexane.

PREPARATION B.—13-ETHYL-17α-ETHINYL-4-GONENE-17β-OL-3-ONE

To a solution of 100 mg. of 3-methoxy-13-ethyl-17α-ethinyl-2,5(10)-gonadiene-17β-ol in 35 ml. of methanol, add 30 ml. of 2% aqueous sulfuric acid solution. Warm the reaction mixture at 50° C. for three hours; then cool and add sufficient aqueous potassium bicarbonate to neutralize the reaction mixture. Concentrate the neutralized mixture in a stream of nitrogen to a volume of approximately 5 ml.; then add water and filter the resultant precipitate of 13 - ethyl - 17α - ethinyl-4-gonene-17β-ol-3-one. Purify by crystallization from acetone-hexane.

In a similar manner, 3-methoxy-13-ethyl-17α-methyl-2,5(10)-gonadiene-17β-ol is reacted with sulfuric acid in methanol to obtain 13-ethyl-17α-methyl-4-gonene-17β-ol-3-one.

*Example 1.—10-hydroperoxy-17α-ethinyl-4-estrene-17β-ol-3-one*

Dissolve 1 g. of 17α-ethinyl-5(10)-estrene-17β-ol-3- one in 20 ml. of pyridine and add 8 mg. of hematoporphyrin. While stirring and illuminating the solution with white light, bubble oxygen through the solution for 18 hours. Pour the reaction solution into 425 ml. of 10% aqueous hydrogen chloride. Filter and wash the precipitate with water and dry at 60° C. Crystallize from ethyl acetate to give 10-hydroperoxy-17α-ethinyl-4-estrene-17β-ol-3-one. M.P. 219.5–221.5° C. $[\alpha]_D^{25}$ —28.5° (dioxane), U.V. absorption: λ max. 234.5 (ϵ=14,200).

Alternatively, the compound of this example is prepared as follows:

Stir a solution of 10 g. of 17α-ethinyl-5(10)-estrene-17β-ol-3-one in 75 ml. of chloroform for four days in the presence of oxygen while illuminating the solution with white light. Concentrate to a residue in vacuo and crystallize from ethyl acetate.

In analogous manner, by starting with the appropriate 5(10)-estrene and subjecting same to the action of oxygen, the corresponding 10-hydroperoxy-4(5)-estrene is formed and isolated. The tabulation set forth below is indicative of the products prepared in such manner:

*Starting 5(10)-estrene*        *Product 4(5)-estrene*

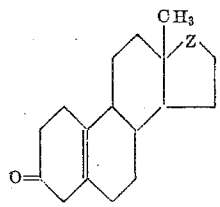 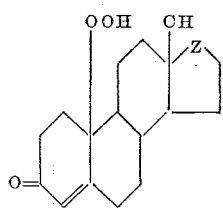

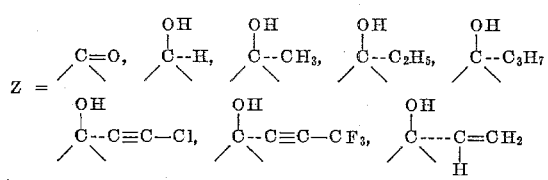

*Example 2.—10-hydroperoxy-17α-ethinyl-4-estrene-17β-ol-3-one 10-acetate*

Dissolve 1.78 g. of 10-hydroperoxy-17α-ethinyl-4-estrene-17β-ol-3-one in 12 ml. of pyridine prechilled to 0° C. Add 6 ml. of acetic anhydride at 0° C. and allow the reaction mixture to stand at room temperature for one hour; then pour into ice water and extract with chloroform. Concentrate the combined chloroform extracts in vacuo and crystallize the resultant residue from ether obtaining 10 - hydroperoxy - 17α-ethinyl-4-estrene-17β-ol-3- one 10-acetate. M.P. 138–139° C. $[\alpha]_D^{25}$ +25.0° (dioxane), U.V. absorption $\lambda_{max.}^{methanol}$ 233.5 (ϵ=14,400)

In a similar manner, by esterifying any of the other 10-hydroperoxy-4-estrenes prepared in Example 1 in the above-described procedure, the analogous acetate ester of the 10-hydroperoxy function is obtained.

When the starting function has Z equal to

e.g., 10-hydroperoxy-4-estrene-17β-ol-3-one of Example 1, under the esterification conditions outlined above in Example 2, the 17-hydroxy function will also esterify to give 10-hydroperoxy-4-estrene-17β-ol-3-one 10, 17-diacetate. The 10-monoacetate of the aforenamed compound is obtained by substituting for 6 ml. of acetic anhydride in the above procedure a quantity which is the molar equivalent of the steroid starting material, i.e., to 1.78 g. of steroid 0.55 ml. of acetic anhydride.

In the esterification procedure outlined above, by substituting for acetic anhydride other lower alkanoic acid anhydrides such as propionic and butyric acid anhydride or by using an acid halide such as benzoyl chloride, there may be obtained the corresponding ester of the 10-hydroperoxy function, e.g., the 10-propionate, 10-butyrate, and 10-benzoate, respectively, of 10-hydroperoxy-17α-ethinyl-4-estrene-17β-ol-3-one.

*Example 3.—10-hydroperoxy-17α-ethinyl-5α-1-estrene-17β-ol-3-one*

A. *2-bromo-17α-ethinyl-5α-estrane-17β-ol-3-one.*—Dissolve 300 mg. of 17α-ethinyl-5α-estrane-17β-ol-3-one in a solution consisting of 6 ml. of dioxane, 0.42 ml. of acetic acid and 0.18 ml. of water. Maintain the solution temperature at 25° C. and add 0.405 ml. of 30% hydrogen bromide in acetic acid. Add rapidly a solution of 160 mg. of bromine in 2.0 ml. of acetic acid-dioxane (1:9). Stir 15 minutes and pour into 100 ml. of 2% aqueous potassium acetate. Filter. The precipitate (Product 3A, 360 mg.) comprises 2-bromo-17α-ethinyl-5α-estrane-17β-ol-3-one and is used in the next step without further purification.

B. *17α - ethinyl-5α-1-estrene-17β-ol-3-one.* — Dissolve 360 mg. of the 2-bromo compound (Product 3A) in 7.3 ml. of dimethylformamide. Add 181 mg. each of lithium bromide and lithium carbonate. Heat at 100° C. for 16 hours. Cool and pour into 1% aqueous hydrogen chloride. Filter and isolate the precipitate (225 mg.). Purify by chromatography on 8 g. of magnesium silicate (Florisil) eluting with hexane-ether combinations containing increasing quantities of ether. Combine the like eluates as determined spectroscopically. Concentrate the pooled, like eluates to a residue and crystallize from hexane-ether obtaining 56 mg. of 17α-ethinyl-5α-1-estrene-17β-ol-3-one, M.P. 182–184° C. $[\alpha]_D^{25}$ +66.9° (dioxane).

C. *17α - ethinyl-1(10)-estrene-17β-ol-3-one.*—Dissolve 0.5 g. of 17α-ethinyl-5α-1-estrene-17β-ol-3-one in 10 ml. of dimethylsulfoxide. Blanket the solution with nitrogen and add 4.4 ml. of sodium acetylide in xylene (20% weight to volume). Stir for one hour at room temperature, pour the mixture onto 200 g. of ice and water. Saturate with sodium chloride and extract with methylene chloride. Wash extracts with water and then dry over magnesium sulfate. Evaporate in vacuo under nitrogen. Crystallize the residue from acetone-hexane under a blanket of argon to obtain 17α-ethinyl-1(10)-estrene-17β-ol-3-one.

D. *10-hydroperoxy-17α-ethinyl-5α-1-estrene-17β - ol - 3-one.*—To a solution of 200 mg. of 17α-ethinyl-1(10)-estrene-17β-ol-3-one in 20 ml. of chloroform add 25 mg. of azoisobutyronitrile; stir for 48 hours, while illuminating with white light. Evaporate to a residue and crystallize from acetone-hexane (1:1) obtaining 10-hydroperoxy-17α-ethinyl-5α-1-estrene-17β-ol-3-one.

*Example 4.—10-hydroperoxy-17α-ethinyl-5α-1-estrene-17β-ol-3-one 10-acetate*

Esterify 10 - hydroperoxy-17α-ethinyl-5α-1-estrene-17β-ol-3-one with acetic anhydride in pyridine according to the procedure of Example 2 to obtain 10-hydroperoxy-17α-ethinyl-5α-1-estrene-17β-ol-3-one 10-acetate.

Similarly, by substituting for acetic acid anhydride in the above procedure other lower alkanoic acid anhydrides such as propionic or butyric acid anhydride or an acid halide such as benzoyl chloride, there is obtained, respectively, the 10-propionate, 10-butyrate, and 10-benzoate of 10-hydroperoxy-17α-ethinyl-5α-1-esterne-17β-ol-3-one.

*Example 5.—9α-bromo-10-hydroperoxy-17α-ethinyl-4-estrene-11β,17β-diol-3-one 10-acetate*

A. *10-hydroperoxy-17α-ethinyl - 4,9(11) - estradiene-17β-ol-3-one.*—Follow the procedure of Example 1 using as starting material 17α-ethinyl-5(10),9(11)-estradiene-17β - ol - 3 - one to obtain 10-hydroperoxy-17α-ethinyl-4,9(11)-estradiene-17β-ol-3-one.

B. *10 - hydroperoxy - 17α - ethinyl - 4,9(11) - estradiene-17β-ol-3-one 10-acetate.*—In a manner similar to that described in Example 2, allow 10-hydroperoxy-17α-ethinyl-4,9(11)-estradiene-17β-ol-3-one to react with acetic anhydride in pyridine. Isolate the resultant product in the described manner to give 10-hydroperoxy-17α-ethinyl-4,9(11)-estradiene-17β-ol-3-one 10-acetate.

C. *9α bromo - 10 - hydroperoxy - 17α - ethinyl - 4-esterene-11β,17β-diol-3-one 10-acetate.*—Cool in an ice bath a mixture of 500 mg. of 10-hydroperoxy-17α-ethinyl-4,9(11)-estradiene-17β-ol-3-one 10-acetate in 40 ml. of purified tetrahydrofuran and 8 ml. of water. Then add 140 mg. of N-bromoacetamide followed by 0.2 ml. of 1.5 N perchloric acid. Stir the mixture in the dark at room temperature for three hours. Dilute the mixture with water and extract with methylene chloride. Wash the combined extracts with aqueous sodium bicarbonate, then water, dry over magnesium sulfate, and concentrate in vacuo to a residue comprising 9α-bromo-10-hydroperoxy-17α-ethinyl-4-estrene-11β,17β - diol - 3 - one 10-acetate. Purify by crystallization from acetone-hexane.

*Example 6.—9α-fluoro-10-hydroperoxy-17α-ethinyl-4-estrene-11β,17β-diol-3-one 10-acetate*

A. *9β,11β - oxido - 10 - hydroperoxy - 17α - ethinyl-4-estren-11β-ol-3-one 10-acetate.*—To a solution of 300 mg. of 9α-bromo-10-hydroperoxy-17α-ethinyl-4-estrene-11β,17β-diol-3-one 10-acetate in 35 ml. of acetone, add 300 mg. of potassium acetate. Heat the mixture under reflux for 3 hours; then concentrate to a volume of about 10 ml. under reduced pressure. Pour the residual solution into ice water, filter the resultant precipitate, and crystallize from acetone-hexane to obtain 9β,11β-oxido-10-hydroperoxy-17α-ethinyl-4-estren-11β-ol - 3 - one 10-acetate.

B. *9α - fluoro - 10 - hydroperoxy - 17α - ethinyl - 4-estrene-11β,17β-diol-3-one 10-acetate.*—Place in a polyethylene container a solution of 500 mg. of 9β,11β-oxido - 10 - hydroperoxy - 17α - ethinyl - 4 - estren-11β-ol-3-one 10-acetate in 20 ml. of ethanol-free chloroform and cool in an ice bath until the solution is at 0° C. Add with stirring 31 ml. of a solution of hydrogen fluoride in ethanol-free chloroform and tetrahydrofuran (prepared by dissolving 42 g. of hydrogen fluoride in 66 ml. of tetrahydrofuran and 31 ml. of ethanol-free chloroform). Allow the reaction mixture to stand at 0° C. for 2 hours; then pour into ice water and add a cold aqueous sodium bicarbonate solution until the reaction mixture has a pH about 7. Extract the aqueous mixture with methylene chloride; then evaporate the combined organic extracts in vacuo to a residue comprising a mixture of 9α - fluoro - 10 - hydroperoxy - 17α - ethinyl-4-estrene-11β,17β-diol-3-one and the 10-acetate ester thereof. Treat this product mixture with acetic anhydride in pyridine in the manner described in Example 2. Isolate the resultant product in the described manner to obtain 9α-fluoro-10-hydroperoxy-17α-ethinyl-4-estrene-11β,17β-diol-3-one 10-acetate. Purify by chromatography on silica gel using increasing amounts of ether in hexane and combining like fractions as determined by thin layer chromatography and spectroscopic analysis. Distill the combined like fractions in vacuo to a residue and crystallize this residue from acetonehexane.

In the above procedure, by using 10 ml. of a 0.18 N. solution of hydrogen chloride in chloroform instead of hydrogen fluoride solution, there is obtained 9α-chloro-10-hydroperoxy-17α-ethinyl-4-estrene-11β,17β-diol-3 - one 10-acetate, which is isolated and purified in the manner described above.

*Example 7.—9α-fluoro-10-hydroperoxy-17α-ethinyl-4-esterene-17β-ol-3,11-dione 10-acetate*

To a solution of 50 mg. of 9α-fluoro-10-hydroperoxy-17α-ethinyl-4-estrene-11β,17β-diol-3-one 10-acetate in 5 ml. of acetone cooled to 5° C., add dropwise chromic acid-sulfuric acid reagent (266 mg. $CrO_3$/ml.) until a permanent orange color is obtained. Keep the solution at room temperature for 5 minutes; then add a little methanol to destroy any excess reagent. Pour the solution into ice water and extract with ether. Combine the ether extractions, wash, and dry over magnesium sulfate, and evaporate in vacuo to a residue of 9α-fluoro-10-hydroperoxy-17α-ethinyl-4-estrene-17β-ol, 3,11-dione 10-acetate.

Similarly, each of 9α-chloro - 10 - hydroperoxy-17α-ethinyl-4-estrene-11β,17β-diol-3-one 10-acetate and 9α-bromo-10-hydroperoxy-17α-ethinyl - 4 - estrene-11β,17β-diol-3-one 10-acetate are reacted with chromic acid-sulfuric acid reagent in acetone in the above described manner and there is obtained, respectively, 9α-chloro-10-hydroperoxy-17α-ethinyl-4-estrene-17β-ol-3,11-dione 10-acetate and 9α-bromo-10-hydroperoxy-17α-ethinyl-4-estrene-17β-ol-3,11-dione 10-acetate.

*Example 8.—10-hydroperoxy-17α-ethinyl-4-estrene-11β,17β-diol-3-one*

A. *3-methoxy-2,5(10)-estradiene-11β,17β-diol.*—Add a solution of 600 mg. of 3-methoxy-1,3,5(10)-estratriene-11β-ol-17-one in 18 ml. of dioxane and 5 ml. of ethanol to 160 ml. of ammonia; then add 900 mg. of lithium. After the lithium has dissolved, evaporate the reaction solution to remove the ammonia; then add water. Filter the resultant precipitate of substantially 3-methoxy-2,5-(10)-estradiene-11β,17β-diol. Purify by crystallization from acetone-hexane.

B. *3-methoxy-2,5(10)-estradiene-11β-ol-17-one.*—Add 3 g. of aluminum isopropoxide in 38 ml. of dry toluene to a solution of 2.2 g. of 3-methoxy-2,5(10)-estradiene-11β,17β-diol in 26 ml. of cyclohexanone and 93 ml. of toluene. Reflux for 2½ hours; then add 20 ml. of a saturated solution of potassium sodium tartrate. Dilute the reaction mixture with water; then separate the organic phase and evaporate to a residue comprising 3-methoxy-2,5(10)-estradiene-11β-ol-17-one. Purify by crystallization from aqueous methanol.

C. *3 - methoxy-17α-ethinyl-2,5(10)-estradiene-11β,17β-diol.*—Under an atmosphere of nitrogen, add 4.5 ml. of an 18% suspension of sodium acetylide in xylene to a solution consisting of 0.25 g. of 3-methoxy-2,5(10)-estradiene-11β-ol-17-one in 10 ml. of dimethylsulfoxide. Stir the reaction mixture under nitrogen at room temperature for one hour; then pour the reaction mixture into ice water and extract with methylene chloride. Evaporate the combined methylene chloride extracts to a residue comprising 3-methoxy-17α-ethinyl-2,5(10)-estradiene-11β,17β-diol. Purify by crystallization from acetone-hexane.

D. *17α-ethinyl-5(10)-estrene-11β,17β-diol-3-one.*—To a solution of 100 mg. of 3-methoxy-17α-ethinyl-2,5(10)-estradiene-11β,17β-diol in 35 ml. of methanol, add 3 ml. of a 2% aqueous sulfuric acid solution. Allow the reaction mixture to remain at room temperature for 35 minutes; then add sufficient aqueous potassium bicarbonate to neutralize the reaction mixture. Concentrate the neutralized mixture in a stream of nitrogen to a volume of approximately 5 ml.; then add water and filter the resultant precipitate of 17α-ethinyl-5(10)-estrene-11β,17β-diol-3-one. Purify by crystallization from acetone-hexane.

E. *10-hydroperoxy-17α-ethinyl-4-estrene-11β,17β-diol-3-one.*—In a manner similar to that described in Example 1, 1 g. of 17α-ethinyl-5(10)-estrene-11β,17β-diol-3-one is dissolved in 20 ml. of pyridine and 8 mg. of hematoporphyrin is added. Expose the solution to oxygen in the described manner and isolate the resultant product to give 10 - hydroperoxy-17α-ethinyl-4-estrene-11β,17β-diol-3-one. Purify by crystallization from ethyl acetate-hexane.

*Example 9.—10-hydroperoxy-17α-methyl-4-estrene-11β,17β-diol-3-one*

A. *3-methoxy-17α-methyl-2,5(10)-estradiene-11β,17β-diol.*—A solution of 600 mg. of 3-methoxy-17α-methyl-1,3,5(10)-estratriene-11β,17β-diol in 18 ml. of dioxane and 4.8 ml. of ethanol is added to 160 ml. of ammonia. To the solution with stirring add 500 mg. of lithium and stir until the lithium disappears. Allow the ammonia to evaporate from the reaction solution; then add water and filter the resultant precipitate of substantially 3-methoxy-17α-methyl-2,5-(10)-estradiene-11β,17β-diol. Purify by crystallization from acetone-hexane.

Alternatively, the compound of this example can be prepared by reacting 3-methoxy-2,5(10)-estradiene-11β-ol-17-one (the compound of Example 8B) with methyl magnesium iodide according to known procedures.

B. *17-methyl-5(10)-estrene-11β,17β-diol-3-one.*—In a manner similar to that described in Example 8D, treat a solution of 100 mg. of 3-methoxy-17α-methyl-2,5(10)-estradiene-11β,17β-diol in 35 ml. of methanol with 3 ml. of a 2% aqueous sulfuric acid solution. Isolate the resultant product in the described manner to give 17α-methyl-5(10)-estrene-11β,17β-diol-3-one.

C. *10 - hydroperoxy-17α-methyl-4-estrene-11β,17β-diol-3-one.*—Stir a solution of 10 g. of 17α-methyl-5(10)-estrene-11β,17β-diol-3-one in 75 ml. of chloroform for 4 days in the presence of oxygen while illuminating the solution with white light. Concentrate the solution to a residue in vacuo to give 10-hydroperoxy-17α-methyl-4-estrene-11β,17β-diol-3-one. Purify by crystallization from ethyl acetate-hexane.

*Example 10.—10-hydroperoxy-4-estrene-11β,17β-diol-3-one*

In a manner similar to that described in Example 8D, treat a methanolic solution of 3-methoxy-2,5(10)-estradiene-11β,17β-diol (the compound of Example 8A) with sulfuric acid. Isolate the resultant product in the decribed manner to give 5(10)-estrene-11β,17β-diol-3-one. Purify by crystallization from acetone-hexane.

In a manner similar to the alternative procedure of Example 1, expose a chloroform solution of 5(10)-estrene-11β,17β-diol-3-one to oxygen. Isolate the resultant product in the described manner to give 10-hydroperoxy-4-estrene-11β,17β-diol-3-one.

*Example 11.—Alternative procedure for the preparation of 10-hydroperoxy-17α-ethinyl-4,9(11)-estradiene-17β-ol-3-one (the compound of Example 5A)*

A. *10-hydroperoxy-17α-ethinyl - 4-estrene-11β,17β-diol-3-one 10-acetate.*—In a manner similar to that described in Example 2, treat 10-hydroperoxy-17α-ethinyl-4-estrene-11β,17β-diol-3-one with acetic anhydride in pyridine to give 10-hydroperoxy-17α-ethinyl-4-estrene-11β,17β-diol-3-one 10-acetate.

B. *10-hydroperoxy-17α-ethinyl - 4,9(11)-estradiene-17β-ol-3-one 10-acetate.*—Dissolve 0.9 g. of 10-hydroperoxy-17α-ethinyl-4-estrene-11β,17β-diol-3-one 10-acetate in 17 ml. of pyridine. Add 0.85 g. of freshly crystallized N-bromoacetamide. Stir the reaction mixture at room temperature in the dark for 15 minutes; then cool to 0° C. and bubble in sulfur dioxide gas for 3 minutes. Dilute the reaction mixture with water and extract with methylene chloride. Evaporate the combined methylene chloride extracts to a residue of 10-hydroperoxy-17α-ethinyl-4,9(11)-estradiene-17β-ol-3-one 10-acetate.

C. *10-hydroperoxy-17a - ethinyl - 4,9(11)-estradiene-17β-ol-3-one.*—To a solution of 50 mg. of 10-hydroperoxy-17α-ethinyl-4,9(11)-estradiene-17β-ol-3-one 10-acetate in 3 ml. of a 9% aqueous methanol solution, add 20 mg. of potassium bicarbonate in 1 ml. of 90% aqueous methanol. Allow the reaction mixture to stand at room temperature for 20 minutes; then dilute with water and extract with ethyl acetate. The combined ethyl acetate extracts are evaporated to a small volume and then hexane is added. The resultant precipitate is filtered to give 10-hydroperoxy-17α-ethinyl - 4,9(11) - estradiene-17β-ol-3-one.

*Example 12.—9α-halogeno-11-oxygenated-10-hydroperoxy-17α-ethinyl-4-estrene-17β-ol-3-one*

In a manner similar to that described in Example 11C, treat each of the following 10-hydroperoxy-9α-halogeno-11-oxygenated-4-estrenes prepared in Examples 6 and 7 with potassium bicarbonate in aqueous methanol:

9α-bromo-10-hydroperoxy - 17α - ethinyl - 4-estrene-11β,17β-diol-3-one 10-acetate 9α-fluoro-10-hydroperoxy-17α-ethinyl - 4-estrene-11β,17β-diol-3-one 10-acetate 9α-chloro-10-hydroperoxy-17α-ethinyl-4-estrene - 11β,17β-diol-3-one 10-acetate 9α-bromo-10-hydroperoxy-17α-ethinyl - 4-estrene-17β-ol-3-,11-dione 10-acetate 9α-fluoro-10-hydroperoxy-17α-ethinyl - 4-estrene-17β-ol-3,11-dione 10-acetate 9α-chloro-10-hydroperoxy - 17α-ethinyl-4-estrene-17β-ol-3,11-dione 10-acetate Isolate the resultant product in the described manner to give, respectively:

9α-bromo-10-hydroperoxy - 17α - ethinyl - 4-estrene-11β,17β-diol-3-one

9α-fluoro-10-hydroperoxy - 17α-ethinyl-4-estrene-11β,17β-diol-3-one

9α-chloro-10-hydroperoxy-17α-ethinyl-4-estrene - 11β,17β-diol-3-one

9α-bromo-10-hydroxyperoxy-17α - ethinyl - 4-estrene-17β-ol-3,11-dione

9α-fluoro-10-hydroperoxy-17α - ethinyl-4-estrene-17β-ol-3,11-dione

9α-chloro-10-hydroperoxy-17α - ethinyl-4-estrene-17β-ol-3,11-dione

*Example 13.—10-hydroperoxy-17α-ethinyl-1,4 estradiene-17β-ol-3-one*

A. *10-hydroperoxy-17α-ethinyl-1,4-estradiene-17β-ol-3-one 10-acetate.*—To a solution of 1 g. of 10-hydroperoxy-17α-ethinyl-4-estrene-17β-ol-3-one 10-acetate (prepared as described in Example 2) in 10 ml. of dioxane, add 1 g. of dichlorodicyanobenzoquinone. Reflux the reaction solution for one hour, cool, and filter. Dilute the filtrate with 100 ml. of methylene chloride and wash with five 50 ml. portions of water; then evaporate to a residue of 10-hydroperoxy-17α-ethinyl - 1,4-estradiene-17β-ol-3-one 10-acetate.

Alternatively, the 1,4-estradiene of this example may be prepared as follows:

To a solution of 1 g. of 10-hydroperoxy-17α-ethinyl- 4-estrene-17β-ol-3-one 10-acetate in 50 ml. of tertiary-butanol containing .07 ml. of pyridine, add 0.3 g. of selenium dioxide. Heat the reaction mixture at reflux temperature for 4 hours; then cool and filter. Evaporate the filtrate to a residue comprising 10-hydroperoxy-17α-ethinyl-1,4-estradiene-17β-ol-3-one 10-acetate. Purify by chromatography on silica gel eluting with hexane containing increasing amounts of ether. Collect the like fractions as evaluated by thin layer chromatography and spectroscopic evaluation and evaporate the combined fractions to a residue containing the purified product.

B. *10-hydroperoxy-17α-ethinyl-1,4-estradiene-17β-ol-3-one.*—In a manner similar to that described in Example 11C treat 10-hydroperoxy-17α-ethinyl-1,4-estradiene-17β-ol-3-one 10-acetate with potassium bicarbonate in aqueous methanol. Isolate the resultant product in the manner described to give 10-hydroperoxy-17α-ethinyl-1,4-estradiene-17β-ol-3-one.

*Example 14.—10hydroperoxy-13-ethyl-17α-ethinyl-4-gonene-17β-ol-3-one and the 10-acetate ester*

A. *3 - methoxy-13-ethyl-2,5(10)-gonadiene-17β-ol.*—In a manner similar to that described in Example 8A, treat 3 - methoxy - 13 - ethyl-1,3,5(10)-gonatriene-17-one with lithium in liquid ammonia. Isolate and purify the resultant product in a manner similar to that described to give 3-methoxy-13-ethyl-2,5(10)-gonadiene-17β-ol.

B. *3-methoxy-13-ethyl-2,5(10)-gonadiene-17-one.*—In a manner simliar to that described in Example 8B, treat 3-methoxy-13-ethyl-2,5(10)-gonadiene-17β-ol with aluminum isopropoxide in cyclohexanone and toluene. Isolate the resultant product in a manner similar to that described to give 3-methoxy-13-ethyl-2,5(10)-gonadiene-17-one.

C. *3-methoxy-13-ethyl- 7α-ethinyl-2,5(10)-gonadiene-17β-ol.*—In a manner similar to that described in Example 8C, treat 3-methoxy-13-ethyl-2,5(10)-gonadiene-17-one with sodium acetylide in dimethylsulfoxide under an atmosphere of nitrogen. Isolate and purify the resultant product in the manner described to give 3-methoxy-13-ethyl-17α-ethinyl-2,5(10)-gonadiene-17β-ol.

D. *13 - ethyl-17α-ethinyl-5(10)-gonene-17β-ol-3-one.*—In a manner similar to that described in Example 8D, treat a methanolic solution of 3-methoxy-13-ethyl-17α-ethinyl-2,5(10)-gonadiene-17β-ol with aqueous sulfuric acid. Isolate and purify the resultant product in a manner similar to that described to give 13-ethyl-17α-ethinyl-5(10)-gonene-17β-ol-3-one.

E. *10 - hydroperoxy-13-ethyl-17α-ethinyl-4-gonene-17β-ol-3-one and the 10-acetate ester thereof.*—In a manner similar to that described in Example 1, expose a chloroform solution of 13-ethyl-17α-ethinyl-5(10)-gonene-17β-ol-3-one to oxygen. Isolate and purify the resultant product in a manner similar to that described to give 10-hydroperoxy-13-ethyl-17α-ethinyl-4-gonene-17β-ol-3-one.

Treatment of the 10-hydroperoxy-4-gonene prepared in the above paragraph with acetic anhydride in pyridine according to the procedure of Example 2 will give 10-hydroperoxy - 13-ethyl-17α-ethinyl-4-gonene-17β-ol-3-one 10-acetate.

*Example 15.—10-hydroperoxy-13-ethyl-17α-methyl-4-gonene-17β-ol-3-one and the 10-acetate ester*

A. *3 - methoxy-13-ethyl-17α-methyl-1,3,5(10)-gonatriene-17β-ol.*—Add dropwise a solution of 1.0 g. of 3-methoxy-13-ethyl-1,3,5(10)-gonatriene-17-one in 50 ml. of tetrahydrofuran to methyl magnesium iodide (prepared from 1.5 g. of magnesium and 5 ml. of methyl iodide) in ether-tetrahydrofuran. Distill this mixture to a boiling temperature of 60° C.; then reflux for 3 hours and stir at room temperature overnight. Cool in an ice bath; then add dropwise a saturated solution of ammonium chloride, then add water. Extract with methylene chloride. Wash the combined extracts with water, dry over magnesium sulfate and concentrate to a residue of 3-methoxy-13-ethyl-17α-methyl-1,3,5(10)-gonatriene-17β-ol.

B. *3 - methoxy-13-ethyl-17α-methyl-2,5(10)-gonadiene-17β-ol.*—In a manner similar to that described in Example 8A, treat 3-methoxy-13-ethyl-17α-methyl-1,3,5(10)-gonatriene-17β-ol with lithium in liquid ammonia. Isolate and purify the resultant product in a manner similar to that described to give 3-methoxy-13-ethyl-17α-methyl-2,5(10)-gonadiene-17β-ol.

C. *13 - ethyl-17α-methyl-5(10)-gonene-17β-ol-3-one.*—In a manner similar to that described in Example 8D, treat a methanolic solution of 3-methoxy-13-ethyl-17α-methyl-2,5(10)-gonadiene-17β-ol with aqueous sulfuric acid. Isolate and purify the resultant product in a manner similar to that described to give 13-ethyl-17α-methyl-5(10)-gonene-17β-ol-3-one.

D. *10 - hydroperoxy-13-ethyl-17α-methyl-4-gonene-17β-ol-3-one and the 10-acetate ester thereof.*—In a manner similar to that described in Example 1, treat a chloroform solution of 13 - ethyl-17α-methyl-5(10)-gonene-17β-ol-3-one with oxygen and isolate and purify the resultant product in the manner described to give 10-hydroperoxy-13-ethyl-17α-methyl-4-gonene-17β-ol-3-one.

In a manner similar to that described in Example 2, esterify the 10-hydroperoxy-4-gonene prepared in the preceding paragraph with acetic acid anhydride in pyridine to give 10 - hydroperoxy - 13-ethyl-17α-methyl-4-gonene-17β-ol-3-one 10-acetate.

*Example 16.—10-hydroperoxy-13-ethyl-4-gonene-3, 17-dione and the 10-acetate ester thereof*

Treat a methanolic solution of 3-methoxy-13-ethyl-2,5(10)-gonadiene-17-one (the compound of Example 14B) with aqueous sulfuric acid in a manner similar to that described in Example 8D. Isolate the resultant product in the described manner to give 13-ethyl-5(10)-gonene-3,17-dione.

Expose a chloroform solution of 13-ethyl-5(10)-gonene-3,-17-dione to oxygen in a manner similar to that described in the alternative procedure in Example 1. Isolate the resultant product in the described manner to give 10-hydroperoxy-13-ethyl-4-gonene-3,17-dione.

Esterify 10 - hydroperoxy-13-ethyl-4-gonene-3,17-dione with pyridine-acetic acid anhydride in a manner similar to that described in Example 2. Isolate the resultant product in the described manner to give 10-hydroperoxy-13-ethyl-4-gonene-3,17-dione 10-acetate.

*Example 17.—10-hydroperoxy-13-ethyl-4-gonene-17β-ol-3-one and the 10-acetate ester*

In a manner similar to that described in Example 8D, treat a methanolic solution of 3-methoxy-13-ethyl-2,5(10)-gonadiene-17β-ol with aqueous sulfuric acid and isolate and purify the resultant product in the described manner to give 13-ethyl-5(10)-gonene-17β-ol-3-one.

Allow a chloroform solution of 13-ethyl-5(10)-gonene-17β-ol-3-one to stand in the presence of oxygen in the manner described in the alternate procedure of Example 1. Isolate and purify the resultant product in the described manner to give 10-hydroperoxy-13-ethyl-4-gonene-17β-ol-3-one.

Treat 10-hydroperoxy-13-ethyl-4-gonene-17β-ol-3 - one with acetic acid anhydride in pyridine in the manner described in the first paragraph of Example 2 to obtain the corresponding 10,17-diacetate ester. When reacted with acetic anhydride in pyridine according to the procedure described in the third paragraph of Example 2, there is obtained the 10-monoacetate ester.

*Example 18.—10-hydroperoxy-13-ethyl-17α-chloroethinyl-4-gonene-17β-ol-3-one and the 10-acetate ester thereof*

A. *3-methoxy-13-ethyl-17α-chloroethinyl-2,5(10)-gonadiene-17β-ol.*—Add 1.6 g. sodium to liquid ammonia (125 ml.) containing 38 mg. ferric nitrate. Stir until blue color disappears, cool to −60° C.; then add 3.3 grams trans-dichloroethylene in ether (10 ml.) over a 20 minute period. Remove the cooling bath and stir the reaction mixture for 30 minutes. Add a solution consisting of 5 grams of 3-methoxy-13-ethyl-2,5(10)-gonadiene-17 - one in 60 ml. tetrahydrofuran over a 20 minute period. Warm the reaction mixture and stir at reflux temperature for 3 hours. Add solid ammonium chloride (7.5 g.) to the reaction mixture then evaporate the ammonia. Add water to the resultant residue and extract with ether. Combine the ether extracts and evaporate to a residue comprising 3-methoxy-13-ethyl-17α-chloroethinyl-2,5(10) - gonadiene-17β-ol. Purify by crystallized from methanol containing a drop of pyridine.

B. *13-ethyl-17α-chloroethinyl-5(10)-gonene-17β-ol - 3-one.*—In a manner similar to that described in Example 8D, treat a methanolic solution of 3-methoxy-13-ethyl-17α-chloroethinyl-2,5(10)-gonadiene-17β-ol with aqueous sulfuric acid. Isolate the resultant product in the described manner to give 13-ethyl-17α-chloroethinyl-5(10)-gonene-17β-ol-3-one.

C. *10-hydroperoxy-13-ethyl-17α-chloroethinyl-4-gonene-17β-ol-3-one and the 10-acetate ester thereof.*—Allow a chloroform solution of 13-ethyl-17α-chloroethinyl-5(10)-gonene-17β-ol-3-one to stand in the presence of oxygen for 4 days in the manner described in the alternate procedure of Example 1. Isolate the resultant product in the described manner to give 10-hydroperoxy-13-ethyl-17α-chloroethinyl-4-gonene-17β-ol-3-one.

Esterify the 10-hydroperoxy-17α-chloroethinyl-4-gonene prepared in the preceding paragraph with acetic acid anhydride in pyridine in the manner described in Example 2. Isolate the resultant product in the described manner to give 10-hydroperoxy-13-ethyl-17α - chloroethinyl - 4-gonene-17β-ol-3-one 10-acetate.

*Example 19.—10-hydroperoxy-17α-methylethinyl - 4 - estrene-17β-ol-3-one and 10-hydroperoxy-13-ethyl - 17α-methylethinyl-4-gonene-17β-ol-3-one and the 10-acetate esters thereof*

A. Saturate with dry methyl acetylide a stirred solution of 500 mg. of 3-methoxy-2,5(10)-estradiene-17-one in 40 ml. of anhydrous ether and 3.7 ml. of dry toluene cooled to 0° C. While a slow stream of methyl acetylide is passed through the reaction mixture, add within a period of 15 minutes a solution of 1000 mg. of potassium tertiary-amylate in 7.5 ml. of anhydrous tertiary-pentanol. Continue stirring the reaction mixture and the passage of methyl acetylide through the solution for an additional 4 and ½ hours. Allow the reaction mixture to stand at 0° C. for 16 hours; then wash the mixture with aqueous ammonium chloride, then with water, and finally with saturated sodium chloride. Dry the organic layer over sodium sulfate; then filter and concentrate in vacuo to a small volume. Add petroleum ether to the cooled residue and filter the resultant precipitate comprising 3-methoxy-17α-methylethinyl-2,5(10)-estradiene-17β - ol. Purify by crystallization from ether.

In the above procedure, by substituting for 3-methoxy-2,5(10)-estradiene-17-one, the compound 3-methoxy-13-ethyl-2,5(10)-gonadiene-17-one there is obtained 3-methoxy-13-ethyl-17α-methylethinyl-2,5(10) - gonadiene - 17β-ol.

B. In a manner similar to that described in Example 8D, treat a methanolic solution of each of 3-methoxy-17α-methylethinyl-2,5(10)-estradiene-17β-ol and 3 - methoxy-13-ethyl-17α-methylethinyl-2,5(10)-gonadiene-17β-ol with 2% aqueous sulfuric acid. Isolate and purify the respective resultant products in the manner described to give 17α-methylethinyl-5(10)-estrene-17β-ol-3-one and 13-ethyl-17α-methylethinyl-5(10)-gonene-17β-ol - 3 - one, respectively.

C. In a manner similar to that described in the alternative procedure of Example 1, allow a chloroform solution of each of 17α-methylethinyl-5(10)-estrene-17β-ol-3-one and 13-ethyl-17α-methylethinyl-5(10)-gonene-17β-ol-3-one to stand in the presence of oxygen for 4 days while illuminating the solution with white light. Isolate and purify the resultant respective products in the manner described to give, respectively, 10 - hydroperoxy - 17α-methylethinyl-4-estrene-17β-ol-3-one and 10-hydroperoxy-13-ethyl-17α-methylethinyl-4-gonene-17β-ol-3-one.

In a manner similar to that described in Example 2, treat each of the 10-hydroperoxy compounds prepared in Example 19C with acetic anhydride in pyridine. Isolate and purify the resultant respective products in the described manner to give 10-hydroperoxy-17α-methylethinyl-4-estrene-17β-ol-3-one 10-acetate and 10-hydroperoxy-13-ethyl - 17α - methylethinyl-4-gonene-17β-ol-3-one 10-acetate.

*Example 20.—17α-methylethinyl-5α-1-estrene-17β-ol-3-one*

A. *17α - methylethinyl-4-esterene-17β-ol-3-one.*— To a solution of 100 mg. of 17α-methylethinyl-5(10)-estrene-17β-ol-3-one in 35 ml. of methanol, add 30 ml. of a 2% aqueous sulfuric acid solution. Warm the reaction mixture at 50° C. for three hours; then cool and add sufficient aqueous potassium bicarbonate to neutralize the reaction mixture. Concentrate the neutralized mixture in a stream of nitrogen to a volume of approximately 5 ml. Add water and filter the resultant precipiate comprising 17α-methylethinyl-4-estrene-17β-ol-3-one. Purify by crystallization from acetone-hexane.

B. *17α-methylethinyl-5α-estrane-17β-ol-3-one.*—Add as rapidly as possible 1 g. of 17α-methylethinyl-4-estrene-17β-ol-3-one dissolved in 50 ml. of tetrahydrofuran to a blue solution of 0.5 g. of lithium in 150 ml. of liquid ammonia. Stir for 30 seconds; then cautiously add solid ammonium chloride until the blue color disappears. Allow the ammonium to evaporate; then add water to the resultant residue and extract with methylene dichloride. Evaporate the combined extracts to a residue comprising 17α-methylethinyl-5α-estrane-17β-ol-3-one. Purify by crystallization from acetone-hexane.

C. *2 - bromo - 17α-methylethinyl-5α-estrane-17β-ol-3-one.*—In a manner similar to that described in Example 3A, treat 17α-methylethinyl-5α-estrane-17β-ol-3-one with bromine and 30% hydrogen bromide in acetic acid and isolate the resultant product in the described manner to give 2 - bromo-17α-methylethinyl-5α-estrane-17β-ol-3-one which is used without further purification in the following procedure.

D. *17α-methylethinyl-5α-1-estrene-17β-ol-3-one.*—In a manner similar to that described in Example 3B, treat a solution of 2-bromo-17α-methylethinyl-5α-estrane-17β-ol-3-one in dimethylformamide with lithium bromide and lithium carbonate. Isolate and purify the resultant product in the described manner to give 17α-methylethinyl-5α-1-estrene-17β-ol-3-one.

*Example 21.—10-hydroperoxy-17α-methyl-5α-1-estrene-17β-ol-3-one*

A. *17α-methyl-5α-1(10)-estrene-17β-ol-3-one.*— To a solution of 2 g. of 17α-methyl-5α-1-estrene-17β-ol-3-one in 40 ml. of dimethylformamide under an atmosphere of nitrogen, add 25 ml. of an approximately 18% suspension of sodium acetylide in xylene. Stir the reaction mixture at room temperature for 15 minutes; then pour into ice water. Extract the resultant mixture with methylene chloride; then combine the organic extracts and evaporate to a residue. Chromatograph over 200 g. of silica gel. Combine the ether in hexane eluates which by spectroscopic evaluation contain the 3-keto-1(10)-product and evaporate to a reside of substantially 17α-methyl-5α-1(10)-estrene-17β-ol-3-one.

In a similar manner, 17α-methyl-5α-1-estrene-17β-ol-3-one 17-acetate, 17α-ethyl-5α1-estrene-17β-ol-3-one and the 17-acetate ester thereof, 5α-1-estrene-17β-ol-3-one and 17α-methylethinyl-5α-1-estrene-17β-ol-3-one upon reaction with sodium acetylide in dimethylformamide in the above-described manner yield, respectively, 17α-methyl-5α-1(10)-estrene-17β-ol-one 17-acetate, 17α-ethyl-5α-1(10)-estrene-17β-ol-3-one, 17α-methyl-5α-1(10)-estrene-17β-ol-3- one 17-acetate, 5α-1(10)-estrene-17β-ol-3-one, and 17α-methylethinyl-5α-1(10)-estrene-17β-ol-3-one.

B. *10 - hydroperoxy-17α-methyl-5α-1-estrene-17β-ol-3-one.*—In a manner similar to that described in Example 3D, illuminate with white light a chloroform solution of 17α-methyl-5α-1(10)-estrene-17β-ol-3-one in the presence of azoisobutyronitrile. Isolate and purify the resultant product in the manner described to give 10-hydroperoxy-17α-methyl-5α-1-estrene-17β-ol-3-one.

In a similar manner, by subjecting a chloroform solution of each of the products obtained in the second paragraph of Examples 21A to the action of oxygen in a manner similar to that described in Example 3D, there is obtained 10-hydroperoxy-17α-methyl-5α-1-estrene-17β-ol-3-one 17 - acetate, 10-hydroperoxy-17α-ethyl-5α-1-estrene-17β-ol-3-one, 10 - hydroperoxy-17α-ethyl-5α-1-estrene-17β-ol-3-one 17-acetate, 10 - hydroperoxy-5α-1-estrene-17β-ol-3-one, and 10 - hydroperoxy-17α-methylethinyl-5α-1-estrene-17β-ol-3-one, respectively.

C. *10 - hydroperoxy-17α-methyl-5α-1-estrene-17β-ol-3-one 10-acetate.*—In a manner similar to that described in the first paragraph of Example 2, treat a pyridine solution of 10-hydroperoxy-17α-methyl-5α-1-estrene-17β-ol-3-one with acetic anhydride. Isolate and purify the resultant product in the described manner to give 10-hydroperoxy-17α-methyl-5α-1-estrene-17β-ol-3-one 10-acetate.

In a similar manner, each of the products obtained in the second paragraph of Example 21B upon treatment with acetic anhydride in pyridine in the manner described in Example 2, will yield, respectively, 10-hydroperoxy-17α-methyl-5α-1-estrene-17β-ol-3-one 10,17-diacetate, 10-hydroperoxy - 17α - ethyl-5α-1-estrene-17β-ol-3-one 10-acetate, 10-hydroperoxy-17α-ethyl-5α-1-estrene-17β-ol-3-one 10,17-diacetate, 10-hydroperoxy-5α-1-estrene-17β-ol-3-one 10,17-diacetate, and 10-hydroperoxy-17α-methylethinyl-5α-1-estrene-17β-ol-3-one 10 acetate.

*Example 22.—17α-methyl-5(10),9(11)-estradiene-17β-ol-3-one*

A. *3-pyrrolidino-17α-methyl-3,5(10),9(11)-estratriene-17β-ol.*—Heat at reflux temperature for 4 minutes a mixture of 10 ml. of methanol, 1 g. of 17α-methyl-4,9-estradiene-17β-ol-3-one and 1 ml. of pyrrolidine. Allow the reaction mixture to remain overnight at room temperature; then cool, filter, and wash with cold aqueous methanol the resultant precipitate of 3-pyrrolidino-17α-methyl-3,5(10),9(11)-estratriene-17β-ol, which is used without further purification in the following proceedure 22B.

In a similar manner, react each of 17α-vinyl-4,9-estradiene-17β-ol-3-one and 17α-chloroethinyl-4,9-estradiene-17β-ol-3-one with pyrrolidine in methanol and there is obtained, respectively, 3-pyrrolidino-17α-vinyl-3,5(10),9(11)-estratriene - 17β - ol and 3-pyrrollidino-17α-chloroethinyl-3,5(10),9(11)-estratriene-17β-ol.

B. *17α-methyl-5(10),9(11)-estradiene-17β-ol-3-one.*—Add 1 g. of 3-pyrrolidino-17α-methyl-3,5(10),9(11)-estratriene-17β-ol of 1 ml. of acetic acid with vigorous stirring. As soon as solution is effected, add 10 ml. of distilled water and allow the mixture to stand for 15 minutes at room temperature. Filter the resultant precipitate comprising 17α - methyl-5(10),9(11)-estradiene-17β-ol-3-one. Purify by crystallization from acetone.

In a similar manner, hydrolyze each of 3-pyrrolidino-17α-vinyl-3,5(10),9(11)-estratriene-17β-ol and 3-pyrrolidino-17α-vinyl-3,5(10),9(11) - estratriene-17β-ol and 3-pyrrolidino-17α-chloroethinyl - 3,5(10),9(11)-estratriene-17β-ol with acetic acid in the above-described manner to give, respectively, 17α-vinyl-5(10),9(11)-estradiene-17β-ol-3-one and 17α-chloroethinyl-5(10),9(11)-estradiene-17β-ol-3-one.

*Example 23.—9α-halogeno-10-hydroperoxy-17α-methyl-4-estrene-11β,17β-diol-3-one and the 10-acetate esters*

Follow the alternative procedure of Example 1 using as starting material 17α-methyl-5(10),9(11)-estradiene-17β-ol-3-one to obtain 10-hydroperoxy-17α-methyl-4,9(11)-estradiene-17β-ol-3-one; then esterify the 10-hydroperoxy group by means of acetic anhydride in pyridine in the manner of Example 2 to give 10-hydroperoxy-17α-methyl-4,9(11)-estradiene-17β-ol-3-one 10-acetate.

In a manner similar to that described in Example 5C, treat 10-hydroperoxy-17α-methyl-4,9(11)-estradiene-17β-ol-3-one 10-acetate with N-bromoacetamide and perchloric acid. Isolate and purify the resultant product in the described manner to give 9α-bromo-10-hydroperoxy-17α-methyl-4-estrene-11β,17β-diol-3-one 10-acetate.

In a similar manner to that described in Example 6A, treat 9α-bromo-10-hydroperoxy-17α-methyl-4-estrene-11β,17β-diol-3-one 10-acetate with potassium acetate in acetone and isolate and purify the resultant product in the manner described to give 9β,11β-oxido-10-hydroperoxy-17α-methyl-4-estrene-17β-ol-3-one 10-acetate. Treatment of the aforenamed 9β,11β-oxido intermediate with hydrogen fluoride in chloroform-tetrahydrofuran or hydrogen chloride in chloroform in the manner described in Example 6B yields, respectively, 9α-fluoro-10-hydroperoxy-17α-methyl-4-estrene-11β,17β-diol-3-one 10-acetate and 9α-chloro-10-hydroperoxy - 17α-methyl-4-estrene-11β,17β-diol-3-one 10-acetate.

Hydrolyze each of the 9α-halogeno-acetoxyperoxy derivatives prepared in this example with potassium bicarbonate in aqueous methanol in a manner similar to that described in Example 11C to give, respectively, 9α-bromo-10 - hydroperoxy - 17α - methyl-4-estrene-11β,17β-diol-3-one, 9α-fluoro-10-hydroperoxy-17α-methyl-4-estrene-11β,17β - diol - 3 - one, and 9α-chloro-10-hydroperoxy-17α-methyl-4-estrene-11β,17β-diol-3-one.

Similarly, by utilizing the sequence of reactions outlined above in this example, 17α-vinyl-5(10),9(11)-estradiene-17β-ol-3-one and 17α - chloroethinyl-5(10),9(11)-estradiene-17β-ol-3-one are each converted to: 9α-bromo-10 - hydroperoxy - 17α - vinyl-4-estrene-11β,17β-diol-3-one 10-acetate, 9α-fluoro-10-hydroperoxy-17α-vinyl-4-estrene-11β,17β-diol-3-one 10-acetate, 9α-chloro-10-hydroperoxy-17α-vinyl-4-estrene-11β,17β-diol-3-one 10 - acetate, 9α-bromo-10-hydroperoxy - 17α - chloroethinyl-4-estrene-11β,17β-diol-3-one 10-acetate, 9α-fluoro-10-hydroperoxy-17α-chloroethinyl-4-estrene-11β,17β-diol-3-one 10-acetate, and 9α-chloro-10-hydroperoxy - 17α - chloroethinyl - 4-estrene-11β,17β-diol-3-one 10-acetate, respectively.

Hydrolysis of the 10-acetate function in each of the foregoing products is effected by utilizing the procedure of Example 11C.

*Example 24.—9α-halogeno-10-hydroperoxy-17α-methyl-4 estrene-17β-ol-3,11-dione and the 10-acetate esters*

Treat 9α-bromo-10-hydroperoxy-17α-methyl-4-estrene-11β,17β-diol-3-one 10-acetate with chromic acid-sulfuric acid reagent in a manner similar to that described in Example 7. Isolate and purify the resultant product in the described manner to give 9α-bromo-10-hydroperoxy-17α-methyl-4-estrene-17β-ol-3,11-dione 10-acetate.

Similarly, each of 9α-fluoro-10-hydroperoxy-17α-methyl-4-estrene-11β,17β-diol-3-one 10-acetate, 9α-chloro-10-hydroperoxy-17α-methyl-4-estrene-11β,17β-diol-3-one 10-acetate, 9α-bromo-10 - hydroperoxy - 17α-vinyl-4-estrene-11β,17β-diol-3-one 10-acetate, 9α-fluoro-10-hydroperoxy-17α-vinyl-4-estrene - 11β,17β diol-3-one 10-acetate, 9α-chloro-10-hydroperoxy-17α-vinyl - 4-estrene-11β,17β-diol-3-one 10-acetate, 9α-bromo-10-hydroperoxy-17α-chloroethinyl-4-estrene-11β,17β-diol-3-one 10-acetate, 9α-fluoro-10-hydroperoxy - 17α-chloroethinyl-4 - estrene - 11β,17β-diol-3-one 10-acetate, and 9α-chloro-10-hydroperoxy-17α-chloroethinyl-4-estrene-11β,17β-diol-3-one 10-acetate are treated with chromic acid-sulfuric acid reagent in the above-described manner to give, respectively, 9α-fluoro-10-hydroperoxy-17α-methyl - 4-estrene-17β-ol-3,11-dione 10-acetate, 9α-chloro-10-hydorperoxy - 17α-methyl-4-estrene-17β-ol-3,11-dione 10-acetate, 9α-bromo-10-hydroperoxy-17α-vinyl-4-estrene-17β-ol-3,11-dione 10-acetate, 9α-fluoro - 10-hydroperoxy-17α-vinyl-4 - estrene-17β-ol-3,11-dione 10-acetate, 9α-chloro-10 - hydroperoxy-17α-vinyl-4-estrene-17β-ol-3,11-dione 10-acetate, 9α-bromo-10-hydroperoxy-17α-chloroethinyl - 4-estrene-17β-ol-3,11-dione 10-acetate, 9α-fluoro-10-hydroperoxy-17α-chloroethinyl-4-estrene-17β-ol-3,11-dione 10-acetate, and 9α-chloro-10-hydroperoxy-17α - chloroethinyl-4-estrene-17β,-ol-3,11-dione 10-acetate.

Hydrolysis of the 10-acetate function in each of the foregoing products is effected by utilizing the procedure of Example 11C.

*Example 25.—10-hydroperoxy-13-ethyl-17α-ethinyl-1,4-gonadiene-17β-ol-3-one and the 10-acetate thereof*

In a manner similar to that described in Example 13A, treat 10-hydroperoxy-13-ethyl-17α-ethinyl-4-gonene-17β-ol-3-one 10-acetate with dichlorodicyanobenzoquinone in dioxane. Isolate and purify the resultant product in the described manner to give 10-hydroperoxy--13-ethyl-17α-ethinyl-1,4-gonadiene-17β-ol-3-one 10-acetate.

In a similar manner, treat each of 10-hydroperoxy-4-estrene-3,17-dione 10-acetate, 10-hydroperoxy-13-ethyl-4-gonene-3,17-dione 10-acetate, 10-hydroperoxy-17α-methyl-4-estrene-17β-ol-3-one 10-acetate, 10-hydroperoxy-13-ethyl-17α-methyl-4-gonene-17β-ol-3-one 10-acetate, and 9α-fluoro-10-hydroperoxy - 17α-ethinyl-4-estrene-11β,17β-diol-3-one 10-acetate with dichlorodicyanobenzoquinone in dioxane to obtain, respectively, 10-hydroperoxy-1,4-estradiene-3,17-dione 10-acetate, 10-hydroperoxy-13-ethyl-1,4-gonadiene-3,17-dione 10-acetate, 10-hydroperoxy-17α-methyl-1,4-estradiene-17β-ol-3-one 10-acetate, 10-hydroperoxy-13 - ethyl-17α-methyl-1,4 - gonadiene-17β-ol-3-one 10-acetate, and 9α-fluoro-10-hydroperoxy-17α-ethinyl-1,4-estradiene-11β,17β-diol-3-one 10-acetate.

Hydrolysis of the 10-acetate function in each of the foregoing products is effected by utilizing the procedure of Example 11C.

*Example 26.—10 - hydroperoxy-17α-ethinyl - 4-estrene-3β,17β-diol and 10-hydroperoxy-17α-ethinyl-4-estrene-3α,17β-diol*

To a solution of 3.3 g. of 10-hydroperoxy-17α-ethinyl-4-estrene-3-one in 616 ml. of methanol at room temperature add 756 mg. of sodium borohydride. Stir at room temperature for 90 minutes, then cautiously add glacial acetic acid dropwise to destroy the excess sodium borohydride until the reaction mixture is about pH 7. Then concentrate the reaction mixture in vacuo to a residue comprising 10-hydroperoxy-17α-ethinyl-4-estrene-3β,17β-diol and the 3α-hydroxy epimer thereof.

Purify by dissolving the residue in ethyl acetate washing the organic layer successively with dilute sodium bicarbonate then water, then evaporating the ethyl acetate solution to a residue which is crystallized from chloroform to give 10-hydroperoxy-17α-ethinyl-4-estrene-3β,17β-diol. M.P. 173–175° C. [α]$_D$ —20.2° (dioxane). To obtain the 3α-epimer, evaporate the chloroform filtrate of 10-hydroperoxy-17α-ethinyl-4-estrene-3β,17β-diol and recrystallize the resultant residue with acetone-hexane whereby is obtained 10-hydroperoxy-17α-ethinyl-4-estrene-3α,17β-diol.

*Example 27.—10-hydroperoxy-17α-ethinyl-4-estrene-3β, 17β-diol-17-acetate and the 3α-epimer thereof*

A. *3-methoxy-17α-ethinyl-2,5(10-estradiene-17β-ol 17-acetate.*—To a solution of 40 g. of 3-methoxy-2,5(10)-estradiene-17-one in 800 ml. of dimethylformamide under an atmosphere of Argon, add 13.4 g. of sodium acetylide. Stir at room temperature for 15 minutes then rapidly add 19.76 ml. acetic anhydride and stir at room temperature for one minute longer. Pour the reaction mixture into eight liters of water containing 250 mg. of sodium chloride and stir under nitrogen for two hours. Filter the resultant precipitate comprising 3-methoxy-17α-ethinyl-2,5(10)-estradien-17β-ol 17-acetate. Purify by crystallization from aqueous methanol containing a drop of pyridine under nitrogen. M.P. 163–170° C. [α]$_D$ +58.8° (dioxane).

In the above procedure, by substituting for acetic anhydride the anhydrides of other lower alkanoic acids such as propionic anhydride and caproic anhydride, there is obtained the corresponding 17α-lower alkonoate acid, i.e. 3-methoxy-17α-ethinyl - 2,5(10)-estradien-17β-ol 17-propionate and 3-ethoxy-17α-ethinyl-2,5(10)-estradien-17β-ol 17-caproate, respectively.

B. *17α-ethinyl-5(10)-estren-17β-ol-3-one 17-acetate.*—To a suspension of 19 gm. of 3-methoxy-17α-ethinyl-2,5(10)-estradien-17β-ol 17-acetate in 16.34 ml. of methanol and 324.9 ml. of water, add 19 gm. of oxalic acid. Stir at room temperature until a complete solution is reached and for 30 minutes longer (about one and one-half hours). Pour the reaction mixture into 16 liters of water and collect by filtration the resultant precipitate comprising 17α-ethinyl-5(10)-estren-17β-ol-3-one 17-acetate which is used without further purification in the procedure immediately following.

In the above procedure, by substituting for 3-methoxy-17α-ethinyl-2,5(10)-estren-17β-ol 17-acetate the corresponding 17-propionate and 17-caproate ester, respectively, there is obtained 17α-ethinyl-5(10)-estren-17β-ol-3-one 17-propionate and 17α-ethinyl-5(10)-estren-17β-ol-3-one 17-caproate, respectively.

C. *10-hydroperoxy-17α-ethinyl - 4-estren-17β-ol-3-one 17-acetate.*—Dissolve 13 gm. of 17α-ethinyl-5(10)-estren-17β-ol-3-one 17-acetate in 208 ml. of carbon tetrachloride. Pass oxygen through the solution while illuminating the solution with four fluorescent lights (four watts each). A precipitate slowly forms. Collect this resultant precipitate after 20–30 and 95 hours. Chromatograph the combined precipitate over 400 gm. of silica gel eluting with increasing percentages of ethyl acetate in chloroform. Combine the like fractions as determined by thin layer chromatography and infrared and ultra-violet spectra data. Evaporate the combined fractions in vacuo to a residue comprising 10-hydroperoxy-17α-ethinyl-4-estren-17β-ol-3-one 17-acetate.

Purify by crystallization from aqueous methanol. M.P. 178–180° C. [α]$_D$ —29° (dioxane).

Similarly, in the above procedure by substituting for 17α-ethinyl-5(10)-estren-17β-ol-3-one 17-acetate, the corresponding 17-propionate and 17-caproate ester thereof there is obtained 10-hydroperoxy-17α-ethinyl-4-estren-17β-ol-3-one 17-propionate, and 10-hydroperoxy-17α-ethinyl-4-estren-17β-ol-3-one 17-caproate, respectively.

D. *10-hydroperoxy - 17α-ethinyl - 4-estrene-3β,17β-diol 17-acetate and the 3α-epimer thereof.*—In a manner similar to that described in Example 26, treat 50 mg. of 10-hydroperoxy-17α-ethinyl-4-estren-17β-ol-3-one 17-acetate with 10 mg. sodium borohydride in 10 ml. methanol. Isolate and purify the resultant product in the manner similar to that described to obtain 10-hydroperoxy-17α-ethinyl-4-estrene-3β,17β-diol 17-acetate and 10-hydroperoxy-17α-ethinyl-4-estrene-3α,17β-diol 17-acetate.

Treat each of 10-hydroperoxy-17α-ethinyl-4-estren-17β-ol-3-one 17-propionate and 10-hydroperoxy-17α-ethinyl-4-estren-17β-ol-3-one 17-caproate with sodium borohydride in methanol and isolate and purify the resultant products in the above described manner to obtain, respectively, 10-hydroperoxy-17α-ethinyl-4-estrene-3β,17β-diole 17-propionate and 10-hydroperoxy-17α-ethinyl-3α,17β-diol 17-propionate and 10-hydroperoxy-17α-ethinyl-4-estrene-3β,17β-diol 17-caproate and 10-hydroperoxy-17α-ethinyl-4-estrene-3α,17β-diol 17-caproate, respectively.

*Alternate process for the preparation of 10-hydroperoxy-17α-ethinyl-4-estrene-3β,17β-diol 17-acetate and the 3α-epimer thereof*

E. *17α-ethinyl-5(10)-estrene-3,17β-diol 17-acetate.*—To a solution of 68 mg. of 17α-ethinyl-5(10)-estren-17β- ol-3-one 17-acetate (the compound of Example 27B) in 10 ml. of methanol at room temperature, add 8 mg. of sodium borohydride. Stir at room temperature for two hours, then add glacial acetic acid until the reaction mixture is about pH 7. Evaporate the reaction mixture to a residue and redissolve the residue in ethyl acetate. Wash the ethyl acetate layer with water, then evaporate the ethyl acetate layer to a residue comprising 17α-ethinyl-5(10)-estrene-3β,17β-diol 17-acetate and the 3α-hydroxy epimer thereof.

Chromatograph the epimeric product over 400 gm. of silica gel, elute with increasing percentages of ether in hexane, combine the like fractions as determined by thin layer chromatography and infrared and ultraviolet spectra data. Evaporate one of the combined like fractions in vacuo to a residue comprising 17α-ethinyl-5(10)-estrene-3α,17β-diol 17-acetate. Purify by crystallization from acetone-hexane.

Similarly, evaporate a second combined like fraction in vacuo (of smaller volume than the first) to a residue comprising 17α-ethinyl-5(10)-estrene-3β,17β-diol 17-acetate.

F. *10-hydroperoxy-17α-ethinyl - 4-estrene - 3β,17β-diol 17-acetate and the 3α-epimer thereof.*—To a solution of 2 gm. of 17α-ethinyl-5(10)-estrene-3β,17β-diol 17-acetate in 40 ml. of pyridine, add 16 mg. of hematoprophyrin. Illuminate the solution with fluorescent light while bubbling oxygen into the solution for 36 hours. Pour the reaction mixture into dilute hydrochloric acid and extract with methylene chloride. Evaporate the combined extractions to a residue comprising 10-hydroperoxy-17α-ethinyl-4-estrene-3β,17β-diol 17-acetate. Purify by chromatographic techniques on silica gel eluting with increasing percentages of acetone in ether. Combine the like portions comprising 10-hydroperoxy-17α-ethinyl-4-estrene-3β,17β-diol 17-acetate as determined by thin layer chromatography and infrared evaluation. Evaporate the combined portions to a residue and recrystallize from acetone-hexane.

Similarly, in the above procedure by substituting 17α-ethinyl-5(10)-estrene-3α,17β-diol for 17α-ethinyl-5(10)-3β,17β-diol, there is obtained 10-hydroperoxy-17α-ethinyl-4-estrene-3α,17β-diol 17-acetate.

*Example 28.—Alternate procedure for the preparation of 10-hydroperoxy-17α - ethinyl-4-estrene-3β,17β-diol and the 3α-epimer thereof*

A. *17α-ethinyl-5(10)-estrene-3β,17β-diol and the 3α-hydroxy epimer thereof.*—In a manner similar to that described in Example 26, treat a solution of 17α-ethinyl-5(10)-estren-17β-ol-3-one in methanol at room temperature with sodium borohydride. Isolate the resultant product in the manner described to obtain a residue comprising 17α-ethinyl-5(10)-estrene-3β,17β-diol and the 3α-hydroxy. Purify the product mixture in the manner described and separate the epimers by fractional crystallization from chloroform to give 17α - ethinyl - 5(10)-estrene-3β,17β-diol and the 17α-ethinyl-5(10)-3α,17β-diol, respectively.

B. *10-hydroperoxy - 17α-ethinyl-4-estrene-3β,17β-diol and the 3α-hydroxy epimer thereof.*—Dissolve 2 g. of 17α-ethinyl-5(10)-3β,17β-diol in 40 ml. of pyridine, then add 16 mg. of hematoporphyrin and bubble oxygen into the solution and illuminate with fluorescent light for 36 hours. Pour the reaction solution into water containing hydrochloric acid, then extract with methylene chloride. Evaporate the methylene chloride extracts to a residue comprising 10-hydroperoxy-17α-ethinyl-4-estrene-3β,17β-diol. Purify by chromatography over silica gel eluting with increasing percentages of ethyl acetate in chloroform. Combine the like portions which have been determined by thin layer chromatography and infrared evaluation to be 10-hydroperoxy-17α-ethinyl-4-estrene-3β,17β-diol.

In a manner similar to that described above, oxygenate 17α-ethinyl-5(10)-estrene-3α,17β-diol and purify the resultant product in the manner described to obtain 10-hydroperoxy-17α-ethinyl-4-estrene-3α,17β-diol.

*Example 29.—10-hydroperoxy-4-estrene-3β,17β-diol and 17α-substituted derivatives thereof and the 3α-hydroxy epimers of the foregoing*

In a manner similar to that described in Example 26, treat with sodium borohydride at room temperature a solution of each of the following 10-hydroperoxy derivatives in methanol:

10-hydroperoxy-4-estren-17β-ol-3-one,
10-hydroperoxy-17α-methyl-4-estren-17β-ol-3-one,
10-hydroperoxy-17α-ethyl-4-estren-17β-ol-3-one,
10-hydroperoxy-17α-propyl-4-estren-17β-ol-3-one,
10-hydroperoxy-17α - chloroethinyl-4-estren-17β-ol-3-one,
10-hydroperoxy-17α - trifluoromethylethinyl-4-estren-17β-ol-3-one, and
10-hydroperoxy-17α-vinyl-4-estren-17β-ol-3-one.

Purify and isolate each of the resultant epimeric products in a manner similar to that described in Example 1 to obtain, respectively, 10-hydroperoxy-4-estrene-3β,17β - diol and 10-hydroperoxy-4-estrene-3α,17β-diol,
10-hydroperoxy-17α-methyl-4 - estrene-3β,17β-diol and 10-hydroperoxy-17α - methyl-4-estrene-3α,17β - diol,
10-hydroperoxy-17α-ethyl-4-estrene - 3β,17β-diol and 10-hydroperoxy-17α-ethyl-4-estrene-3α,17β-diol,
10-hydroperoxy-17α - propyl-4-estrene-3β,17β-diol and 10-hydroperoxy-17α-propyl-3α,17β-diol,
10-hydroperoxy-17α - chloroethinyl-4-estrene - 3β,17β-diol and 10-hydroperoxy-17α - chloroethinyl-4-estrene-3α,17β-diol,
10-hydroperoxy-17α - trifluoromethylethinyl-4-estrene-3β,17β-diol and 10-hydroperoxy-17α - trifluoromethylethinyl-4-estrene-3α,17β-diol,
10-hydroperoxy-17α-vinyl-4-estrene-3β,17β-diol and 10-hydroperoxy-17α-vinyl-4-estrene-3α,17β-diol, respectively.

*Example 30.—10-hydroperoxy-17α-ethinyl-4-estrene-3β,17β-diol 3,10-diacetate and the 3α-epimer thereof*

A. Add 0.33 gm. of 10-hydroperoxy-17α-ethinyl-4-estrene-3β,17β-diol to a solution of 5 ml. of pyridine and 0.2 ml. of acetic anhydride maintained at about 5° C. After two hours pour the reaction solution into water and extract the resultant mixture with methylene chloride. Evaporate the combined methylene chloride extracts to a residue comprising 10 - hydroperoxy - 17α-ethinyl-4-estrene-3β,17β-diol 3,10-diacetate. Purify by crystallization from acetone-hexane.

B. Similarly, by utilizing the above procedure but substituting for acetic anhydride each of the following: propionic acid anhydride, caproic acid anhydride, caprylic acid anhydride, and benzoyl chloride, there is obtained the following 3,10-diacylates, respectively:

10-hydroperoxy-17α-ethinyl-4-estrene-3β,17β-diol 3,10-dipropionate,
10-hydroperoxy-17α-ethinyl-4-estrene-3β,17β-diol 3,10-dicarproate,
10-hydroperoxy-17α-ethinyl-4-estrene-3β,17β-diol 3,10-dicaprylate, and
10-hydroperoxy-17α-ethinyl-4-estrene-3β,17β-diol 3,10-dibenzoate.

C. Treat 10-hydroperoxy-17α-ethinyl-4-estrene-3α,17β-diol with acetic anhydride in pyridine in a manner similar to that described in paragraph 30A above and isolate and purify the resultant product in a manner similar to that described to obtain 10-hydroperoxy-17α-ethinyl-4-estrene-3α,17β-diol 3,10-diacetate.

*Example 31.—10 - hydroperoxy - 17α - ethinyl - 4 - estrene-3β,17β-diol 3-acetate and 3α-epimer thereof*

A. Stir at room temperature for 30 minutes a solution of 165 mg. of 10-hydroperoxy-17α-ethinyl-4-estrene-3β,17β-diol 3,10-diacetate and 33.6 mg. of sodium bicarbonate in 20 ml. of 90 percent aqueous methanol. Add acetic acid to the reaction mixture until the solution is at approximately pH 7. Then evaporate to a residue comprising 10-hydroperoxy-17α-ethinyl-4-estrene-3β,17β-diol 3-acetate. Purify by triturating the residue with water, collecting the insoluble solution by filtration and then recrystallizing the insoluble solution from acetonehexane.

B. In a manner similar to that described in paragraph 31A above, treat each of the 3,10-di-esters prepared in Example 30B with sodium bicarbonate in aqueous methanol. Isolate and purify the resultant products in a manner similar to that described to obtain, respectively, 10-hydroperoxy-17α-ethinyl-4-estrene-3β,17β-diol 3-propionate, 3-caproate, 3-caprylate, and 3-benzoate.

C. Treat 10-hydroperoxy-17α-ethinyl-4-estrene-3α,17β-diol 3,10-diacetate in a manner similar to that described in Example 31A. Isolate and purify the resultant product in the manner described to obtain 10-hydroperoxy-17α-ethinyl-4-estrene-3α,17β-diol 3-acetate.

*Example 32.—10 - hydroperoxy - 17α - ethinyl - 4 - estrene-3β,17β-diol 10,17-diacetate and the 3α-epimer thereof*

A. Add 376 mg. of 10-hydroperoxy-17α-ethinyl-4-estrene-3β,17β-diol 17-acetate (the compound of Example 27) to a solution of 5 ml. of pyridine and 0.095 ml. of acetic anhydride maintained at about 15° C. After 2.5 hours pour the solution into water and extract the resultant mixture with methylene chloride. Evaporate the combined methylene chloride extracts to a residue comprising 10 - hydroperoxy - 17α - ethinyl - 4 - estrene - 3β,17β-diol 10,17-diacetate.

B. Treat 10 - hydroperoxy - 17α - ethinyl - 4 - estrene-3α,17β-diol 17-acetate with acetic anhydride in pyridine at 15° C. in the manner described in paragraph 32A above to obtain 10 hydroperoxy - 17α - ethinyl - 4 - estrene - 3α,17β-diol 10,17-diacetate.

C. In the procedure described in Experiment 32A above by substituting caproic acid anhydride for acetic anhydride and isolating and purifying the resultant product, there is obtained 10-hydroperoxy-17α-ethinyl-4-estrene-3β,17β-diol 10-caproate 17-acetate.

*Example 33.—10 - hydroperoxy - 17α - ethinyl - 4 - estrene-3β,17β-diol 3,10,17-triacetate*

A. In a manner similar to that described in Example 30A, add 0.094 gm. of 10-hydroperoxy-17α-ethinyl-4-estrene-3β,17β-diol 17-acetate to a cooled solution of 3 ml. of pyridine and 0.050 ml. of acetic anhydride. Allow the reaction mixture to stand three hours, then isolate and purify the resultant product in a manner similar to that described in Example 30A to obtain 10-hydroperoxy-17α-ethinyl-4-estrene-3β,17β-diol 3,10,17-triacetate.

B. Similarly, treat 10-hydroperoxy-17α-ethinyl-4-estrene-3α,17β-diol 17-acetate with acetic anhydride in pyridine in the above described manner to obtain 10-hydroperoxy - 17α - ethinyl-4-estrene-3α,17β-diol 3,10,17-triacetate.

C. In the procedure described in Example 33A, by substituting for acetic anhydride caproic acid anhydride and benzoyl chloride, respectively, there is obtained 10-hydroperoxy - 17α - ethinyl - 4 - estrene - 3β,17β - diol 3,10 - dicaproate 17-acetate and 10-hydroperoxy-17α-ethinyl-4-estrene-3β,17β-diol 3,10-dibenzoate 17-acetate, respectively.

*Example 34.—10 - hydroperoxy - 13 - ethyl - 4 - gonene-3β,17β-diol and the 17α-substituted derivatives thereof and the 3α-hydroxy epimers of the foregoing*

In a manner similar to that described in Example 26, treat with sodium borohydride at room temperature a solution of each of the following 10-hydroperoxy derivatives in methanol: 10-hydroperoxy-13-ethyl-4-gonen-17β-ol-3-one, 10-hydroperoxy-13-ethyl-17α-methyl-4-gonen-17β-ol-3 - one, 10 - hydroperoxy - 13 - ethyl - 17α - chloroethinyl-4-gonen-17β-ol-3-one, and 10-hydroperoxy-13-ethyl-17α-propinyl-4-gonen-17β-ol-3-one.

Purify and isolate each of the resultant epimeric products in a manner similar to that described in Example 26 to obtain, respectively, 10-hydroperoxy-13-ethyl-4-gonene-3β,17β - diol and 10 - hydroperoxy-13-ethyl-4-gonene-3α,17β-diol;

10 - hydroperoxy - 13 - ethyl - 17α - methyl - 4 - gonene-3β,17β - diol and 10 - hydroperoxy - 13 - ethyl - 17α-methyl-4-gonene-3α,17β-diol;

10 - hydroperoxy - 13 - ethyl - 17α - chloroethinyl - 4-gonene-3β,17β-diol and 10 - hydroperoxy-13-ethyl-17α-chloroethinyl-4-gonene-3α,17β-diol;

10 - hydroperoxy - 13 - ethyl - 17α - propinyl - 4-gonene-3β,17β-diol and 10-hydroperoxy-13-ethyl-17α-propinyl-3α,17β-diol.

We claim:

1. A composition of matter selected from the group consisting of a 10-hydroperoxy-α(β)-unsaturated-3-keto-13-alkyl-gonane, a 10-hydroperoxy-4-dehydro-3-hydroxy-13-alkyl-gonane and the 10-benzoyl and 10-lower alkanoyl esters thereof, said 13-alkyl gonane having a configuration about the 17-position represented by the following partial formula:

$$\underset{17}{\overset{O}{\underset{\|}{C}}}, \text{ and } \overset{OR}{\underset{\diagup}{\overset{\diagdown|}{C}}} -Y$$

wherein R is a member selected from the group consisting of H, benzoyl and lower alkanoyl, and Y is a member selected from the group consisting of H, lower alkyl, lower alkenyl, lower alkynyl and halogeno lower alkynyl.

2. A composition of matter selected from the group of compounds having the following structural formula:

[structural formula]

wherein A is a member selected from the group consisting of oxygen, (H,βOR″), and (H,αOR″), R′ and R″ are members selected from the group consisting of hydrogen, benzoyl, and lower alkanoyl; W is lower alkyl; and Z is a member of the group consisting of $$\underset{\diagup \diagdown}{\overset{O}{\underset{\|}{C}}}, \text{ and } \overset{OR}{\underset{\diagup}{\overset{\diagdown|}{C}}} -Y$$

wherein R is a member selected from the group consisting of hydrogen, benzoyl and lower alkanoyl and Y is a member selected from the group consisting of hydrogen, lower alkyl, lower alkenyl, lower alkynyl, halogenoethinyl, and trifluoromethylethinyl; and when A is oxygen, the 1-dehydro and 1-dehydro-4,5-dihydro analogs thereof.

3. The compound of claim 2 wherein A is oxygen, R′ is hydrogen, W is methyl, and Z is $$\overset{OR}{\underset{\diagup}{\overset{\diagdown|}{C}}} -Y$$

Y being ethinyl and R being hydrogen; said compound having the name 10-hydroperoxy-17α-ethinyl-4-estren-17β-ol-3-one.

4. The compound of claim 2 wherein A is oxygen, R' is hydrogen, W is methyl, and Z is

Y being methyl and R being hydrogen; said compound having the name 10-hydroperoxy-17α-methyl-4-estren-17β-ol-3-one.

5. The compound of claim 2 wherein A is oxygen, R' is hydrogen, W is methyl, and Z is

said compound having the name 10-hydroperoxy-4-estrene-3,17-dione.

6. The compound of claim 2 wherein A is oxygen, R' is hydrogen, W is methyl, and Z is

Y being chloroethinyl and R being hydrogen; said compound having the name 10-hydroperoxy-17α-chloroethinyl-4-estren-17β-ol-3-one.

7. The compound of claim 2 wherein A is oxygen, R' is hydrogen, W is methyl, and Z is

Y and R being hydrogen; said compound having the name 10-hydroperoxy-4-estren-17β-ol-3-one.

8. The 1-dehydro-4,5-dihydro compound of claim 2 wherein A is oxygen, R' is hydrogen, W is methyl, Z is

R being hydrogen and Y being ethinyl; said compound having the name 10-hydroperoxy--17α-ethinyl-5α-1-estren-17β-ol-3-one.

9. The 1-dehydro-4,5-dihydro compound of claim 2 wherein A is oxygen, R' is hydrogen, W is methyl, and Z is

R being hydrogen and Y being methyl; said compound having the name 10-hydroperoxy-17α-methyl-5α-1-estren-17β-ol-3-one.

10. The 1-dehydro-4,5-dihydro compound of claim 2 wherein A is oxygen, R' is hydrogen, W is methyl, and Z is

said compound having the name 10-hydroperoxy-5α-1-estrene-3,17-dione.

11. The 1-dehydro-4,5-dihydro compound of claim 2 wherein A is oxygen, R' is hydrogen, W is methyl, and Z is

R and Y being hydrogen; said compound having the name 10-hydroperoxy-5α-1-estren-17β-ol-3-one.

12. The compound of claim 2 wherein A is (H,βOH), R' is hydrogen, W is methyl, and Z is

R being hydrogen and Y being ethinyl; said compound having the name 10-hydroperoxy-17α-ethinyl-4-estrene-3β,17β-diol.

13. The compound of claim 2 wherein A is (H,βOH), R' is hydrogen, W is methyl, and Z is

R being acetyl and Y being ethinyl; said compound having the name 10-hydroperoxy-17α-ethinyl-4-estrene-3β,17β-diol 17-acetate.

14. The process for preparing a member selected from the group consisting of a 10-hydroperoxy-α(β)-unsaturated-3-keto compound of the 13-lower alkyl gonane series and a 10-hydroperoxy-4-dehydro-3-hydroxy compound of the 13-lower alkyl gonane series which comprises subjecting a solution of a compound selected from the group consisting of a 3-keto-13-lower alkyl gonane having a β(γ) unsaturation terminating at C–10 and a 3-hydroxy-5(10)-dehydro-13-lower alkyl gonane in an inert solvent, to the action of oxygen in the presence of light.

15. The presence of claim 14 wherein the oxygenation is effected in the presence of an oxygen carrier.

16. The process of claim 15 wherein the oxygen carrier is hematoporphyrin.

17. The process of claim 14 wherein the oxygenation is effected in the presence of a free radical initiator.

18. The process of claim 17 wherein the free radical initiator is azoisobutyronitrile.

19. The process for the manufacture of 10-hydroperoxy - 17α - ethinyl-4-estren-17β-ol-3-one which comprises bubbling oxygen through a solution of 17α-ethinyl-5(10)-estren-17β-ol-3-one in a non-reactive solvent in the presence of light and isolating the product formed therefrom.

20. The process of claim 19 wherein oxygenation occurs in the presence of an oxygen carrier.

21. The process for preparing a member selected from the group consisting of a 3-hydroxy-10-hydroperoxy-4-dehydro compound of the 13-lower alkyl gonane series and the 10-lower alkanoates thereof which comprises reacting a member selected from the group consisting of a 3-keto-10-hydroperoxy-13-lower alkyl-4-gonene in a lower alkanol with an alkali metal borohydride.

22. The process of claim 21 wherein said lower alkanol is methanol.

23. The process of claim 21 wherein said alkali metal borohydride is sodium borohydride.

24. The process of claim 21 wherein said lower alkanol is methanol and said alkali metal borohydride is sodium borohydride.

25. The process of claim 24 including the additional step of isolating the thereby formed 3-hydroxy-10-hydroperoxy-4-dehydro compound of the 13-lower alkyl gonane series or 10-lower alkanoate thereof.

26. The process of claim 21 for the manufacture of 3-hydroxy-10-hydroperoxy - 17α - ethinyl-4-estrene-3,17β-diol which comprises reacting 10-hydroperoxy-17α-ethinyl-4-estren-17β-ol-3-one in methanol with sodium borohydride.

No references cited.

LEWIS GOTTS, *Primary Examiner.*

ELBERT L. ROBERTS, *Assistant Examiner.*